(12) United States Patent
Cartwright et al.

(10) Patent No.: US 11,602,869 B2
(45) Date of Patent: Mar. 14, 2023

(54) LABEL CUTTER

(71) Applicant: ILLINOIS TOOL WORKS INC., Glenview, IL (US)

(72) Inventors: Kevin Roy Cartwright, Birmingham (GB); Hugh Connell, Evesham (GB); Ian Taylor, Kenilworth (GB)

(73) Assignee: ILLINOIS TOOL WORKS INC., Glenview, IL (US)

( * ) Notice: Subject to any disclaimer, the term of this patent is extended or adjusted under 35 U.S.C. 154(b) by 44 days.

(21) Appl. No.: 17/099,935

(22) Filed: Nov. 17, 2020

(65) Prior Publication Data

US 2021/0154872 A1  May 27, 2021

(30) Foreign Application Priority Data

Nov. 21, 2019  (GB) ........................... 1916969
Jun. 15, 2020  (GB) ........................... 2009063

(51) Int. Cl.
*B26D 1/30* (2006.01)
*B23D 15/06* (2006.01)

(52) U.S. Cl.
CPC ............. *B26D 1/305* (2013.01); *B23D 15/06* (2013.01)

(58) Field of Classification Search
CPC ............. Y10T 83/8781; Y10T 83/8778; Y10T 83/8808; Y10T 83/8807; Y10T 83/8805; Y10T 83/8804; Y10T 83/8809; B26D 1/30; B26D 1/25; B26D 1/255; B26D 1/26; B26D 1/265; B26D 5/14; B26D 5/16; B26D 5/18; B23D 15/06; B23D 15/08
See application file for complete search history.

(56) References Cited

U.S. PATENT DOCUMENTS

| | | | | |
|---|---|---|---|---|
| 3,857,316 A * | 12/1974 | Handley | ................ | B23D 15/14 83/644 |
| 4,054,076 A * | 10/1977 | Kumabe | ................ | B23D 15/08 83/646 |
| 5,347,699 A * | 9/1994 | Ward | ....................... | B26D 3/12 83/695 |
| 6,347,896 B1 * | 2/2002 | Robinson | ................. | B26D 3/12 400/621 |
| 2004/0089126 A1 * | 5/2004 | McLean | ................. | B26D 7/025 83/605 |

(Continued)

FOREIGN PATENT DOCUMENTS

| | | |
|---|---|---|
| CH | 492505 A | 6/1970 |
| CN | 205238124 U | 5/2016 |

(Continued)

*Primary Examiner* — Phong H Nguyen
(74) *Attorney, Agent, or Firm* — Thompson Hine LLP

(57) ABSTRACT

A label cutter including a blade having a curved cutting edge configured and arranged to move towards a platen in order to cut a label material placed between them. The label cutter has a force applicator arranged and configured to apply a force to a portion of the blade in the direction of the platen. The label cutter includes an actuator operatively coupled to the force applicator and operable to cause the force applicator to move. The force applicator is moveable in order to, in use, apply a force to consecutive portions of the blade in the direction of the platen so as to provide a rolling engagement between the blade and the platen. A label issuing device including a label cutter is also provided.

18 Claims, 20 Drawing Sheets

(56) References Cited

U.S. PATENT DOCUMENTS

2013/0205958 A1* 8/2013 Janszen ................. B29D 30/46
 83/581.1
2017/0203456 A1 7/2017 Van Laar

FOREIGN PATENT DOCUMENTS

| EP | 1358976 A1 | 11/2003 |
| FR | 2521469 A1 | 8/1983 |
| GB | 1553988 A | 10/1979 |
| GB | 2464684 A | 4/2010 |
| JP | H0737518 U | 7/1995 |
| JP | 2011230200 A | 11/2011 |
| WO | WO 9200169 A1 | 1/1992 |

* cited by examiner

LABEL CUTTER

This present invention relates to a label cutter and to a label issuing device. In particular, the present invention relates to a label cutter that is suitable for cutting a linerless label material having an adhesive surface on one side and to a label issuing device comprising such a label cutter.

BACKGROUND

Labels are used for a large variety of purposes, for example, they are attached to packaging for commercial products or food products to indicate their contents, to machinery to indicate their model number, for pricing purposes and also for branding, to name a few. Labels can also be used for postage, to indicate the address for postal. Typically, labels are provided with an adhesive side that can be used to stick (i.e. adhere) to the target surface. A non-adhesive backing sheet is usually used to cover the adhesive side and separated when the adhesive label is to be stuck to the desired surface. Traditionally, a roll of adhesive label having a backing sheet attached, is provided in a continuous roll. The continuous roll is then cut to the desired length which may be for example, a single label, or a number of labels. However, the use of traditional adhesive labels having a backing sheet is not preferable because the backing sheet, once removed for the adhering process, becomes waste. Also, having both adhesive label and backing sheet on a roll requires two layers of materials, thus generally half of the material on a roll of adhesive layers is wasted. That is, the backing sheets represent approximately one half of the total thickness and mass of the label.

The cutting of the continuous roll can be carried out using a cutter such as a guillotine or scissors, or a cutting apparatus having a blade such as an industrial knife cutting machine. Some label cutters have an integrated sensor which can detect the end of a label, and provide precision cutting of labels at a high speed. For example, machine-readable markings are provided on the label so that a cutter or a printer having an integrated cutter can detect and precisely cut labels into units. However, this results sometimes in markings still being visible after cutting. The markings on the labels, which may be barcodes or quick response (QR) codes or the like, sometimes become unreadable.

There have been attempts to produce a label that is capable of being stuck to a desired surface, but which does not have a backing layer (i.e. a linerless label) in efforts of removing or at least partially mitigating these problems. However, the cutting process for separating a continuous roll of adhesive label becomes difficult. Typically, guillotines, scissor-type cutters, or other two-bladed cutter designs have been used. However, the cutting surface used to cut the labels come into contact with the adhesive surface of the label and struggles to cut the label, or fails to provide a precise cut. This is because the label adheres to the cutting surface of the blade and causes the build-up of adhesive or glue, making subsequent cuts increasingly more difficult. This problem can be realised when cutting a label with scissors having the backing layer already removed. The wiping action of cutting of opposing blades causes adhesive to dull the blades, which requires a more regular replacement of the blades. The build-up of adhesive or glue is also problematic as it requires cleaning of the blades.

It is an object of the invention to alleviate or mitigate at least one or more of the aforementioned problems. Particularly, it is desirable to provide a label cutter that can be used to cut linerless labels. More specifically, it would be desirable to provide a label cutter that can be used to cut linerless labels having an adhesive on one side, and which is more resistant to dulling and thus, requires less frequent replacement. It would also be desirable to provide a label cutter which is resistant to the build-up of adhesive or glue on its surface.

BRIEF SUMMARY OF THE DISCLOSURE

In accordance with the present invention there is provided a label cutter according to the appended claims.

According to an aspect, the present invention a label cutter comprising a blade having a curved cutting edge configured and arranged to move towards a platen in order to cut a label material placed between them; a force applicator being arranged and configured to apply a force to a portion of the blade in the direction of the platen; an actuator operatively coupled to the force applicator and operable to cause the force applicator to move; the force applicator being moveable in order to, in use, apply a force to consecutive portions of the blade in the direction of the platen so as to provide a rolling engagement between the blade and the platen.

Thus, a label cutter with a blade having a curved cutting edge is provided, the curved cutting edge being capable of cutting the label material in a rolling motion (i.e. a rocking motion) such that consecutive portions along the surface of the curved cutting surface contact and cut the label material in a sequential manner. That is, there is provided point-to-point contact along the surface of the blade onto the label material. This is advantageous, because force from the blade is distributed along the surface of the platen, which reduces wear of both, the platen and the blade. The frequency of replacing the platen and the blade is therefore reduced. Additionally, a width-full cut across the curvature of the blade onto the platen is also provided, while reducing the footprint of the cutter. That is, a curved-edge cutting blade of a smaller size is capable of cutting a label of a given width, compared to a cutting blade having a non-curved profile.

In some embodiments, the curved cutting edge is a curved cutting surface or an otherwise curved profile that is capable of performing a cut.

In some preferred embodiments, the blade comprises a body portion having the curved cutting edge at a first edge and a supporting edge at the opposing edge. By having a blade which comprises a body portion having a curved cutting edge at a first edge and a supporting edge at the opposing edge, the label material can be positioned in place on the first edge of the blade. The supporting edge of the blade provides safety for handling the blade, and provides a surface for engaging with additionally parts of the label cutter. The label cutter may, for example have a roller that engages with the supporting edge of the blade to urge it towards the platen and thus, cut the label therebetween.

In specific embodiments, the blade is a mezzaluna (half-moon) blade.

In specific embodiments, the blade comprises a single curved cutting edge. A blade comprising a single curved cutting edge provides a continuous rolling motion the label material and distributes the force exerted by the blade.

In some embodiments, the curved cutting edge is convex in the direction of the platen. This provides a smooth profile across the cutting edge of the blade, providing a uniform distribution of force from the blades. This is advantageous since replacement of the blade and/or the platen will be required less frequently. That is, the label cutter can undergo a high number cutting cycles before parts of the label cutter, i.e. the blade and/or the platen, need to be replaced.

In specific embodiments, the force applicator is configured and arranged to, in use, apply an equal force to consecutive portions of the blade in the direction of the platen. By applying an equal force to consecutive portions of the blade in the direction of the platen, wear of the blade and wear of the platen is further prevented. That is, the impact of the blade is reduced by applying an equal force across the consecutive portions.

In specific embodiments, the consecutive portions comprise substantially the full length of the blade. By having consecutive portions comprising substantially the full length of the blade, the equal force can be applied across the full length of the blade. This is particularly advantageous because the label cutter can be cut across the whole length of the blade cutter without dulling the blade. This also prevents the adhesive side of the label from sticking and building up adhesive or glue on the surface of the cutting edge of the blade.

In some embodiments the force applicator is moveable along the length of the blade. In this way, force applicator being arranged and configured to apply a force to the whole length of the blade towards the platen.

In specific embodiments, the force applicator comprises a roller.

In specific embodiments, the roller comprises a longitudinal axis perpendicular to the curved cutting edge of the blade and further wherein the roller is caused to move, by the actuator, in a direction perpendicular to its longitudinal axis and parallel to the curved cutting edge of the blade. Thus, the roller can be moved along and apply a force along consecutive portions of the curved cutting edge of the blade towards the platen.

In some preferred embodiments, the roller exerts a force on the supporting edge of the blade in which the force is transferred through the body portion of the blade to the curved cutting edge of the blade.

In some embodiments, the roller exerts a constant force on the curved cutting edge of the blade as it moves along the length of the blade. Applying a constant force on the curved cutting edge via a roller as it moves along the length of the blade provides an advantageous of reducing the wear of the cutting edge of the blade. Thus, the blade can be used for an increased number of cutting cycles before needing to be replaced. The blade can also, or alternative be used for an increased number of cutting cycles before needing to be cleaned. The maintenance of the blade can thus be reduced.

In some preferred embodiments, the roller is resiliently biased against the blade. This is particularly advantageous because the roller is urged into contact with the blade so as to provide a constant force when cutting.

In specific embodiments, the blade comprises an engaging portion that protrudes from the body portion. This is beneficial because the engaging portion can retain the blade in place. Moreover, the blade engaging portion repositions the blade to maintain the blade in the desired position. In specific embodiments, the engaging portion contacts the roller and defines a position where the blade is pivoted around a corner. This causes the blade to rotate downwards, providing space for paper or adhesive feed past the blade.

In some preferred embodiments, the engaging portion contacts the force applicator to define a pivot position. That is, the pivot position is defined by a contact point between the engaging portion and the force applicator. Advantageously, when the force applicator contacts the engaging portion, a small amount of additional travel towards the engaging portion causes the force applicator to urge further towards the engaging portion.

In specific embodiments, the blade is caused by the force applicator to rotate away from the platen by rotating about the pivot position. Advantageously, the rotation increases the space between the blade and the platen to allow for easy access to insert, remove or adjust material placed between the blade and the platen.

In specific embodiments, the engaging portion is configured to engage the force applicator when the force applicator is in a predetermined position. In this way, the engaging portion provides a locating function to position the force applicator.

In specific embodiments, the force applicator comprises a pair of arms spaced apart from one another along the length of the blade and each operatively coupled to the blade and to the actuator. By providing arms that are spaced apart from one another along the length of the blade, a force can be applied to either or both arms to move the cutting edge of the blade in rolling motion to exert a gradual force towards the platen.

In some specific embodiments, the pair of arms are each pivotably coupled to the blade.

In specific embodiments, the force applicator further comprises a pair of frame members, each of which are operatively coupled to one of the pair of arms respectively and configured to cause the arm to which it is coupled to move towards and away from the platen in response to operation of the actuator.

In some embodiments, the pair of frame members form an articulated linkage configured and arranged to transfer the operating force applied to a portion of the blade by the force applicator from one of the pair of arms to the other in response to operation of the actuator. This is particularly advantageous because the pair of arms can be coupled to one another, transferring operating force smoothly through the linkage of the frame members in response to the actuator. This facilitates a force transfer from one arm to the other along the blade such that the force is evenly distributed along the whole rolling motion of the blade onto the platen.

In specific embodiments, wherein the articulated linkage comprises a gear arrangement between the pair of frame members. The gear arrangement provides a force transfer through the linkage and reduces slippage between the frame members.

In some preferred embodiments, each of the pair of frame members causes the arm to which it is operatively coupled to pivot with respect to the blade such that the force applicator exerts a force in a direction substantially normal to the curved cutting edge. A force can thus be exerted across the length of the blade normal to the direction of the curved cutting edge towards the platen.

In certain embodiments, the force applicator is pivotably coupled to the blade.

In specific embodiments, the force applicator is operable to apply a force to a portion of the blade in the direction of the platen and normal to the portion of the curved cutting edge lying on the vector of the applied force.

In some embodiments, the platen is fixed in position relative to the blade.

In other embodiments, the platen is moveable relative to the blade. By having a platen that is moveable to the blade, the platen can be offset in order to load and unload the label material into and out of the label cutter between the platen and the blade.

In some preferred embodiments, the platen is a rotatable cylinder. This is particularly beneficial because the platen can be rotated such that if a portion of the platen has worn or is otherwise damaged, the platen can be rotated on a surface portion that is not worn, and replacement of the platen is required less frequently.

In some preferred embodiments, the surface of the platen comprises one or more grooves. This is advantageous since the grooves of the platen can produce a label material that is partially cut, or that is cut in certain places and not cut in other portions which are aligned to the grooves.

The one or more grooves can be, for example, provided on a rotatable cylinder platen in certain angular positions so as to provide partial cutting along the width of the label material in those angular positions. The cylinder platen could then be rotated onto a surface which does not have one or more grooves, so as to provide full cutting along the width of the label material. Thus, there is provided a label cutter which can provide both a full cut and a partial cut in a relatively simplistic manner.

In certain embodiments, the platen comprises a resiliently deformable surface. Thus, the action of the blade pushing into the resiliently deformable surface of the platen moves the label material away from the point of cut, further reducing the adhesive and glue otherwise collected on the cutting edge of the blade. Thus, the blade can be used across a larger number of cutting cycles before replacement of the blade is required.

According to another aspect, the present invention provides a label issuing device comprising a label cutter. Thus, the label issuing device has an integral label cutter having the benefits as previously described above. Specifically, the label issuing device can produce a linerless label and which can be cut without dulling the blade. The longevity of the label issuing device having the label cutter is therefore improved.

BRIEF DESCRIPTION OF THE DRAWINGS

Embodiments of the invention are further described hereinafter with reference to the accompanying drawings, in which.

DETAILED DESCRIPTION

Figure 1:
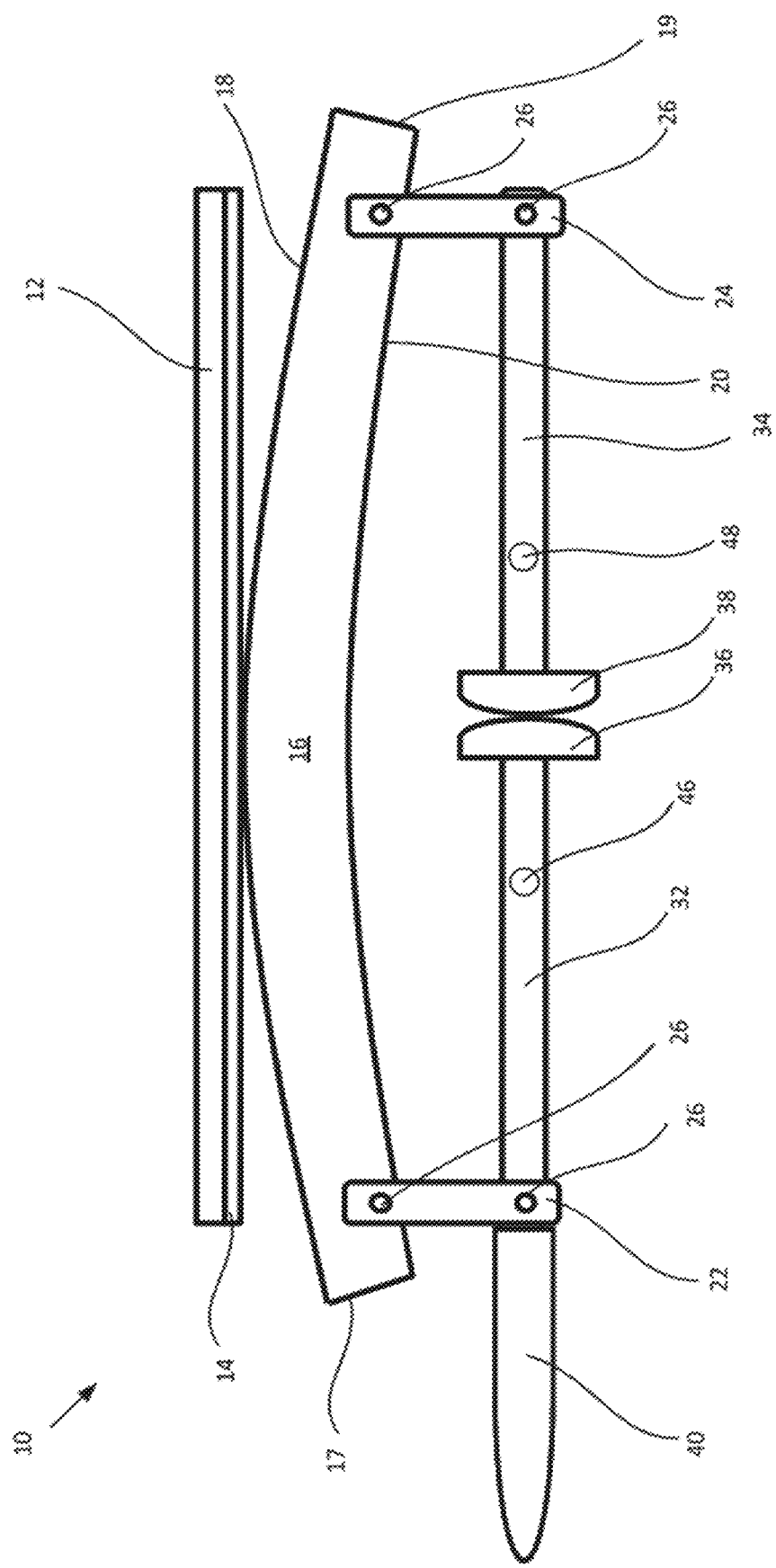
FIG. 1 is a schematic view of a label cutter according to an embodiment.

Like reference numerals are used to depict like features throughout.

As used herein, the term "actuator" is used to describe a member that is operable or can be engaged with to operate or cause movement of the label cutter. The actuator may be a lever arm used to operate portions of the label cutter such as, for example, the arm members or the frame members to move the blade generally towards the platen.

As used herein, the term "articulated linkage" is used to describe the assembly of members together such that the movement of one member causes at least another member of the assembly to move. For example, members of an articulated linkage are coupled to one another and in a contacting relationship.

As used herein, the term "blade" is used to describe a surface of a cutter or a tool that is capable of cutting a material by contacting the material.

As used herein, the term "consecutive" is used to describe an adjacent or sequential positioning. For example, consecutive portions of a blade refer to sections of the blade which are next to one another, i.e. gradually moving along the surface of the blade.

As used herein, the term "mezzaluna" is used to describe a substantially semi-circular shaped blade.

As used herein, the term "platen" is used to describe an anvil-like structure, against which a blade or a tool can be pressed against.

As used herein, the term "rolling engagement" is used to contact between two surfaces or members involving a rolling motion (i.e. a rocking motion), such as a curved surface meeting a flat surface. For example, the rolling engagement between blade and platen is such that consecutive portions along the surface of the curved cutting surface contact and cut the label material in a sequential manner. That is, there is provided point-to-point contact along the surface of the blade onto the label material.

Certain terminology is used in the following description for convenience only and is not limiting. The words 'right', 'left', 'lower', 'upper', 'front', 'rear', 'upward', 'down' and 'downward' designate directions in the drawings to which reference is made and are with respect to the described component when assembled and mounted. The words 'inner', 'inwardly' and 'outer', 'outwardly' refer to directions toward and away from, respectively, a designated centreline or a geometric centre of an element being described (e.g. central axis), the particular meaning being readily apparent from the context of the description.

Further, as used herein, the terms 'connected', 'attached', 'coupled', 'mounted' are intended to include direct connections between two members without any other members interposed therebetween, as well as, indirect connections between members in which one or more other members are interposed therebetween. The terminology includes the words specifically mentioned above, derivatives thereof, and words of similar import.

Further, unless otherwise specified, the use of ordinal adjectives, such as, "first", "second", "third" etc. merely indicate that different instances of like objects are being referred to and are not intended to imply that the objects so described must be in a given sequence, either temporally, spatially, in ranking or in any other manner.

FIG. 1 illustrates a label cutter 10. The label cutter 10 comprises a platen 12 and a blade 16. The blade 16 has a body with a curved profile. More specifically, blade 16 has a first end 17 and a second end 19, a cutting edge 18 proximal and facing the platen 12, and a supporting edge 20 that is distal and facing away from the platen 12. The cutting edge 18 of the blade 16 has a curved surface. In this example, the supporting edge 20 also has a curved surface having substantially the same curvature as that of the cutting edge 18. The cutting edge 18 of the blade 16 and the supporting edge 20 of the blade 16 are concentric to each other. In some examples, the blade 16 is a mezzaluna blade. In some examples, the cutting edge 18 of the blade 16 is convex in the direction of the platen 12. In the configuration shown in FIG. 1, the blade 16 is in a neutral position where a central portion of the blade 16 is closer to the platen 12 than portions along the cutting edge 18 of the blade towards the first end 17 and the second end 19. In use, a label material 14 is placed between the blade 16 and the platen 12 to be cut. A portion of the cutting edge 18 of the blade is in contact with the label material 14 at a given instance in time. For example, in the neutral position, a central portion of the blade 16 cutting edge 18 is in contact with the label 14. The label 14 has a non-adhesive side placed in contact with the platen 12, and an adhesive side facing the blade 16. In some examples, only a tip of the cutting edge 18 contacts the label 14.

A first force applicator 22 is provided proximal the first end 17 of the blade 16. A second force applicator 24 is provided proximal the second end 19 of the blade 16. Each of the first 22 and second 24 force applicators are attached near the supporting edge 20 of the blade 16 via a pin 26. The first force applicator 22 and the second force applicator 24 are spaced apart from each other along the length of the blade 16. The first force applicator 22 is provided with an additional pin 26 through which the first force applicator 22 is attached to a first gear arm 32. Similarly, the second force applicator 24 is provided with an additional pin 26 through which the second force applicator 24 is attached to a second gear arm 34. The first gear arm 32 is provided with a first gear head 36 at an end of the first gear arm 32. The second gear arm 34 is provided with a second gear head 38 at an end of the second gear arm 34. In this configuration, the first gear head 36 and the second gear head 38 are arranged to mesh with one another such that gear teeth (not shown) of both the first gear head 36 and the second gear head 38 can interlock with one another. In this example, the first force applicator 22 is pivotable about the pin 26 by which the first force applicator 22 is attached to the blade 16. Also, the second force applicator 24 is pivotable about the pin 26 by which the second force applicator 24 is attached to the blade 16.

Pins 26 connect the first force applicator 22 to the blade 16, and the second force applicator 24 to the blade 16. Additional pins 26 connect the first force applicator 22 to the first gear arm 32. Additional pins 26 also connect the second force applicator 24 to the second gear arm 34. This effectively creates a linkage between the first force applicator 22 and the first gear arm 32, and a linkage between the second force applicator 24 and the second gear arm 34. That is, a first linkage is formed from the first force applicator 22 and the first gear arm 32. A second linkage is formed from the second force applicator 24 and the second gear arm 34. Each of the first linkage and the second linkage is connected and coupled to the blade 16. Thus, movement of either the first force applicator 22 or the first gear arm 32 causes blade 16 to move. Likewise, movement of either the second force applicator 24 or the second gear arm 34 causes the blade 16 to move. More specifically, moving either the first force applicator 22 or the first gear arm 32 causes a force to be applied to the blade 16 near the first end 17 of the blade 16 towards the platen 12. Moving either the second force applicator 24 or the second gear arm 34 causes a force to be applied to the blade 16 near the second end 19 of the blade 16 towards the platen 12. The first gear head 36 and the second gear head 38 are arranged to mesh with one another. This a linkage between the first linkage comprising the first force applicator 22 and the first gear arm 32, and the second linkage comprising the second force applicator 24 and the second gear arm 34. Thus, when either of the first force applicator 22 and the first gear arm 32 is moved (i.e. a force is applied to them), the second force applicator 24 and the second gear arm 34 also move. For example, when a force is applied to the first linkage such that the first force applicator 22 moves generally upward, and thus the end proximal the first end 17 of the blade 16 moves upward, a force in substantially the opposite direction is applied to the second linkage such that the second force applicator 24 moves generally downward.

Since both the first force applicator 22 and the second force applicator 24 are attached to the blade 16, the side of the blade 16 near the first end 17 moves generally upward while the side of the blade 16 near the second end 19 moves generally downward. This causes a force to be applied to the blade 16 along consecutive portions of the blade 16. That is, a force is applied gradually along the profile of the cutting edge 18. For example, the blade 16 starts in the neutral position where a central portion of the blade 16 is placed in contact with the label 14 to be cut. As the first force applicator 22 moves upward, the end of the first gear arm 32 near the first gear head 36 moves downward and causes the second force applicator 24 to move downwards. As a result, the curved cutting edge 18 of the blade 16 moves in a rolling motion such that gradually, consecutive portions along the cutting edge 18 of the blade 16 contact the label 14. That is, initially contact between the blade 16 and the label 14 (i.e. the blade 16 pushing against the platen 12) occurs at the centre of the blade, and gradually the blade 16 rolls such that engagement between the blade 16 and the label 14 towards the platen 12 moves along the surface of the cutting edge 16 towards the first end 17. This rolling motion and rolling engagement will be described in more detail with reference to the later drawings. It should be appreciated that in some examples, the blade 16 pushes towards the platen 12 such that the label 14 tends to move away from the point of cut.

An actuator 40 in the form of a handle is provided in the label cutter 10 assembly. The handle 40 can be operated by a user to move the first force applicator 22. In this example, the handle 40 is connected to the first gear arm 32 of the first linkage, however it should be appreciated that the handle 40 could instead be mounted or otherwise coupled to the first force applicator. It should also be appreciated that the handle could be mounted on any component of the first linkage or the second linkage, so long as the operation of the handle causes the first force applicator 22 and/or the second force applicator 24 to move. The operation of the handle 40 causes the components to which the handle 40 is coupled to, to move towards or away from the platen 12. For example, the actuator 40 could be coupled to the second force applicator 24 or to the second gear arm 34, for example. The user could also directly move the first linkage and/or the second linkage to cause cutting edge 18 of the blade 16 to rollingly engage with the platen 12 to cut the label 14. The handle 40 could also be provided with a gripping portion (not shown) that provides an area for the user to grip. The handle 40 could also, or alternatively, have a receiving portion (e.g. see FIG. 3, 242) for a user to engage the handle 40 with. In this particular example, the first gear arm 32 is provided with a pivot point 46. Also in this particular example, the second gear arm 34 is provided with a pivot point 48. A constant couple is applied to the first gear arm 32 at pivot point 46. Alternatively, a constant couple is applied to the second gear arm 34 at pivot point 48. The magnitude of the couple is applied such as to reliably affect a cut of the label 14 via an action of the blade 16. The purpose of the pivot points 46,48 will further be made clearer with reference to the subsequent drawings. In other examples, it is envisaged that the actuator 40 could be arranged inboard on the blade so as to reduce the overall size and footprint of the label cutter 10.

Figure 2:
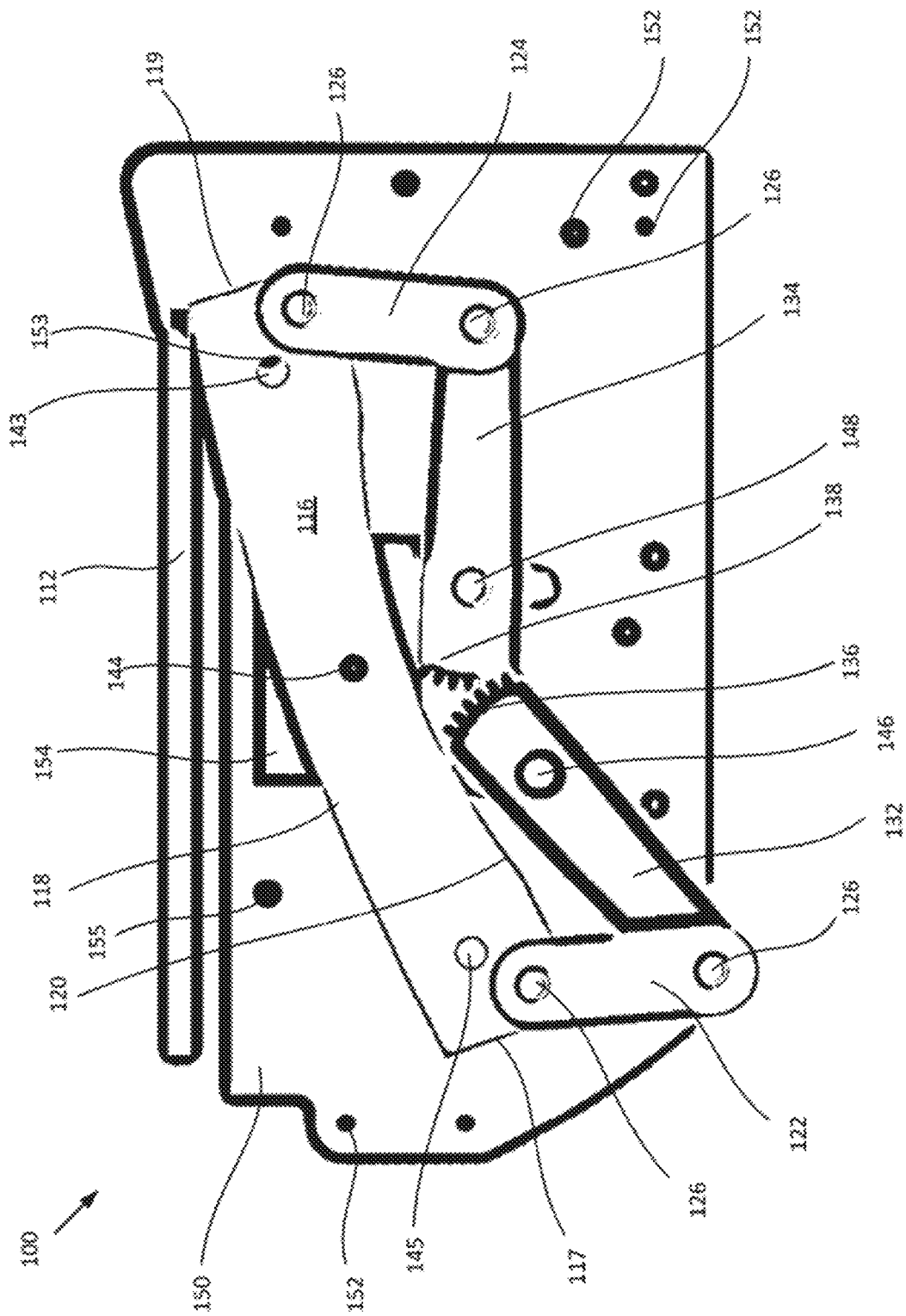
FIG. 2 is a front view of a label cutter according to another embodiment in a first configuration.

FIG. 2 shows a label cutter 100 comprising a platen 112 and a blade 116. The label cutter 100 in this example is provided with a mounting rig 150 having a plurality of mounting apertures 152 provided and arranged through the surface of the mounting rig 150. The mounting rig 150 can be arranged on a surface of an apparatus or a work surface (not shown) and thus can affix the label cutter 100 thereon. For example, the mounting rig 150 can be mounting onto an end of a label manufacturing apparatus so as to provide a cutting station to unitise the labels. Mounting the rig 150 onto, for example, the apparatus or work surface can be done by arranging one or more of apertures 152 with apertures on the apparatus or work surface, for example, and placing a fastener therethrough to hold the label cutter 100 in place. Alternatively, the mounting rig 150 can be placed onto the surface to which the label cutter 100 is desired to be mounted, and holes can be drilled to the surface, and a fastener inserted therethrough to hold the label cutter 100 in place. The mounting rig 150 is further provided with a window 154 through which the other side of the mounting rig 150 can be viewed.

The label cutter 100 is substantially as described in FIG. 1 so will not be described again in detail. Additionally in FIG. 2, however, the blade 116 further comprises a number of apertures 143,144,145. More specifically, the blade 116 is provided with a first aperture 145 near the first end 117 of the blade 116, a second aperture 143 near the second end 119 of the blade 116, and a central aperture 144 near the centre of the blade 116. In this example, the mounting rig is additionally provided with first rig aperture 155 and a second rig aperture 153. The first rig aperture 155 is configured to align with, or at least partially align with, the first aperture 145 of the blade 116 when the blade 116 is at one extreme position. Similarly, the second rig aperture 153 is configured to align with, or at least partially align with, the second aperture 143 of the blade 116 when the blade 116 is at another extreme position. At least partially align with, in this context, refers to where two apertures at least partly overlap one another. This is advantageous because it provides an indication of when the blade 116 is at an extreme position. An alternative benefit of this is that a fastener can be inserted through for example, the first rig aperture 155 and the first aperture 145 of the blade 116, holding the blade 116 in a desired position.

Figure 3:
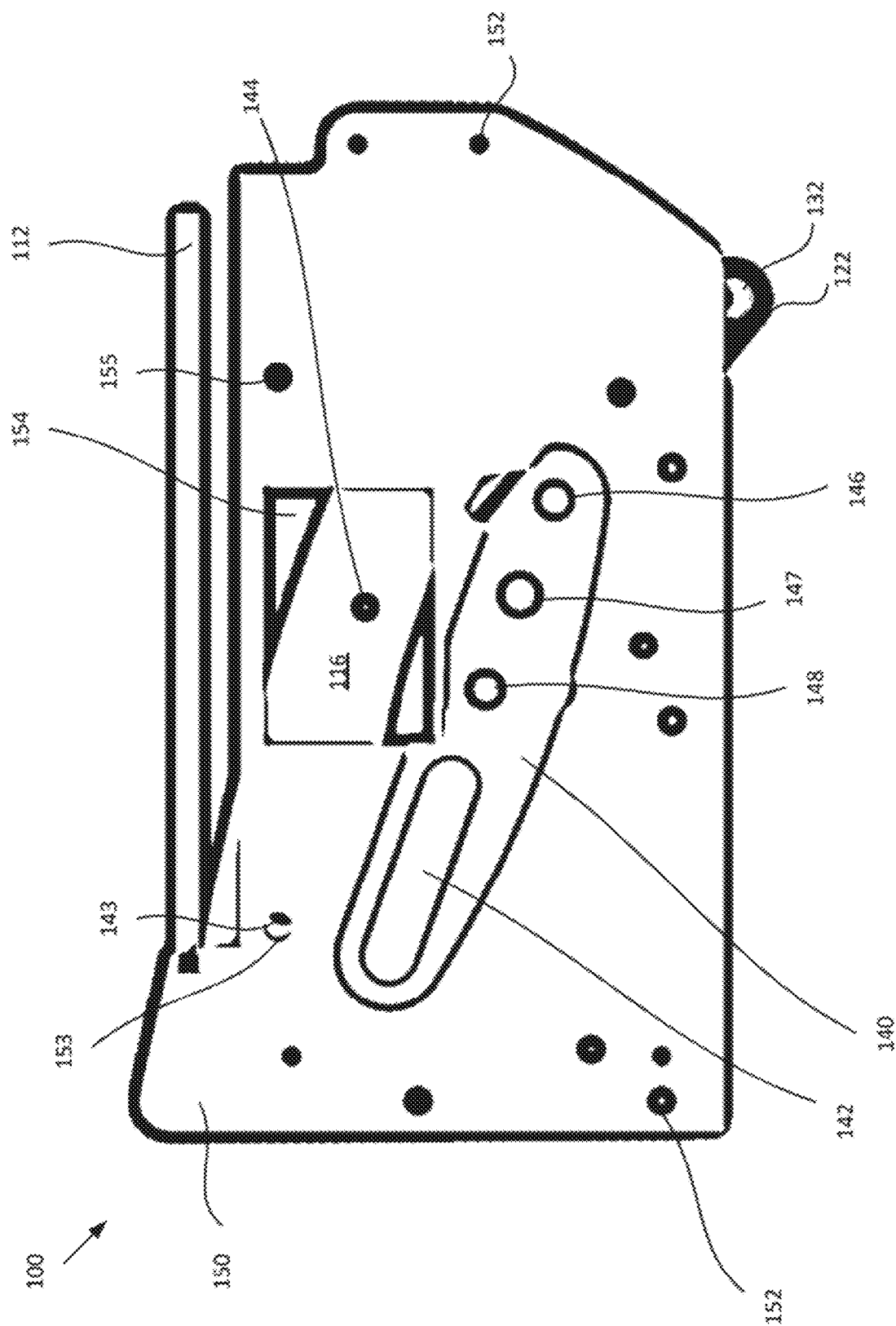
FIG. 3 is a rear view of the label cutter in FIG. 2.

Referring now to FIG. 2 and FIG. 3 in combination, the label cutter 100 is shown at a right-most extremity, where the side proximal the second end 119 of the blade 116 is arranged to move towards the platen 112. As the first force applicator 122 moves down, the end of the first gear arm 132 distal the first gear head 136 moves downward also. The other end of the first gear arm 132 proximal the first gear head 136 does not move down since the first gear head 136 is in contacting engagement with the second gear head 138. The meshing of the first gear head 136 and the second gear head 138 causes the second force applicator 124 to move upwards, exerting a force on the blade 116 in an upward direction on the side proximal the second end 119. The simultaneous downward movement of the first force applicator 122 and the upward movement of the second force applicator 124 in an articulating linkage causes the blade 116 to move in a rolling motion against the platen 112 from the neutral position (i.e. central position) to the right-most extremity position shown in FIG. 2. As a result, the curved cutting edge 118 of the blade 116 moves in a rolling motion such that gradually, consecutive portions along the cutting edge 118 of the blade 116 contact the label 114. The rolling motion of the blade 116 onto the platen 112 exerts a constant force on the cutting edge 118 of the blade 116 as it moves across consecutive portions of the cutting edge 118. That is, the rolling motion of the blade 116 causes a point-to-point contact along the surface of the blade 116.

Though not specifically shown in FIG. 2, the blade also moves to the left-most extremity, where the side proximal the first end 117 of the blade 116 is arranged to move towards the platen 112. In the left-most extremity position, second force applicator 124 moves downward. In response to the downward movement of the second force applicator 124, the end of the second gear arm 134 distal the second gear head 138 moves downward also. The other end of the second gear arm 134 proximal the second gear head 138 does not move down since+the second gear head 138 is in contacting engagement with the first gear head 136. The meshing of the second gear head 138 and the first gear head 136 causes the first force applicator 122 to move upwards, exerting a force on the blade 116 in an upward direction on the side proximal the first end 117. The simultaneous downward movement of the second force applicator 124 and the upward movement of the first force applicator 122 in an articulating linkage causes the blade 116 to move in a rolling motion against the platen 112 towards the left-most extremity position. As a result, the curved cutting edge 118 of the blade 116 moves in a rolling motion towards the left-most extreme position such that gradually, consecutive portions along the cutting edge 118 of the blade 116 contact the label 114. The rolling motion of the blade 116 onto the platen 112 exerts a constant force on the cutting edge 118 of the blade 116 as it moves across consecutive portions of the cutting edge 118. That is, the rolling motion of the blade 116 causes a point-to-point contact along the surface of the blade 116.

As shown in FIG. 3, on the rear side of the label cutter 100 there is provided with a handle 140. The handle 140 is provided with a pivot point 148 which is aligned with the pivot point 148 provided on the second gear arm 134 via a pin (not shown). The second gear arm 134 is rotatable about pivot point 148. In a similar manner, the handle is provided with another pivot point 146 which is aligned with the pivot point 146 in the first gear arm 132 via a pin (not shown). The first gear arm 132 is rotatable about pivot point 146. Thus, the handle 140 is configured to rotate about pivot point 147 positioned in between the pivot points 146,148. The handle 140 is coupled to each of the first gear arm 132 and the second gear arm 134. The handle 140 is further provided with a receiving portion 142 that is designed for a user to grip and turn the handle 140. In other examples, it is envisaged that the handle is driven by a pin and crank (not shown). Additionally or alternatively, it is envisaged that the handle may be driven by a power source such as, but not limited to a DC motor or a stepper motor (not shown). When the handle 140 is turned, the first 132 and second 134 gear arms move, and therefore the first 122 and second 124 force applicators move as hereinbefore described. This provides a rolling engagement between the blade 116 and platen 112. This arrangement of the handle 140 is particularly beneficial over the configuration in FIG. 1 since the handle 140 is coupled to both the first gear arm 132 and the second gear arm 134. A disadvantage associated with the particular arrangement of FIG. 1 is that the handle 40 in FIG. 1 is coupled to one of the first gear arm 32 and second gear arm 34. That is, the handle 40 is closer to one gear arm than the other. Because of this, the forces exerted by the respective force applicators 22,24 are slightly uneven, though this is not substantial. In this particular example, the mounting rig 150 is provided with a viewing window 116 through which the position of the blade 116 can be seen. By providing the handle 140 to be coupled to be the first gear arm 132 and the second gear arm 134, both the first force applicator 122 and the second force applicator 124 function to provide equal force application to consecutive portions of the blade 116 in the direction of the platen 112. That is, an even force is distributed along the blade 116 cutting edge 118 so as to roll the blade 116 cutting edge 118 towards the surface of the platen 112 to cut the label material positioned in between the blade 116 and the platen 112. Given the arrangement of the handle 146 coupled to both the first gear arm 132 and the second gear arm 134, and a constant force applied to the gear arrangement between the first gear arm 132 and the second gear arm 134, the force applied when the blade 116 is positioned at both the left-most and right-most extremities are substantially the same.

Figure 4:
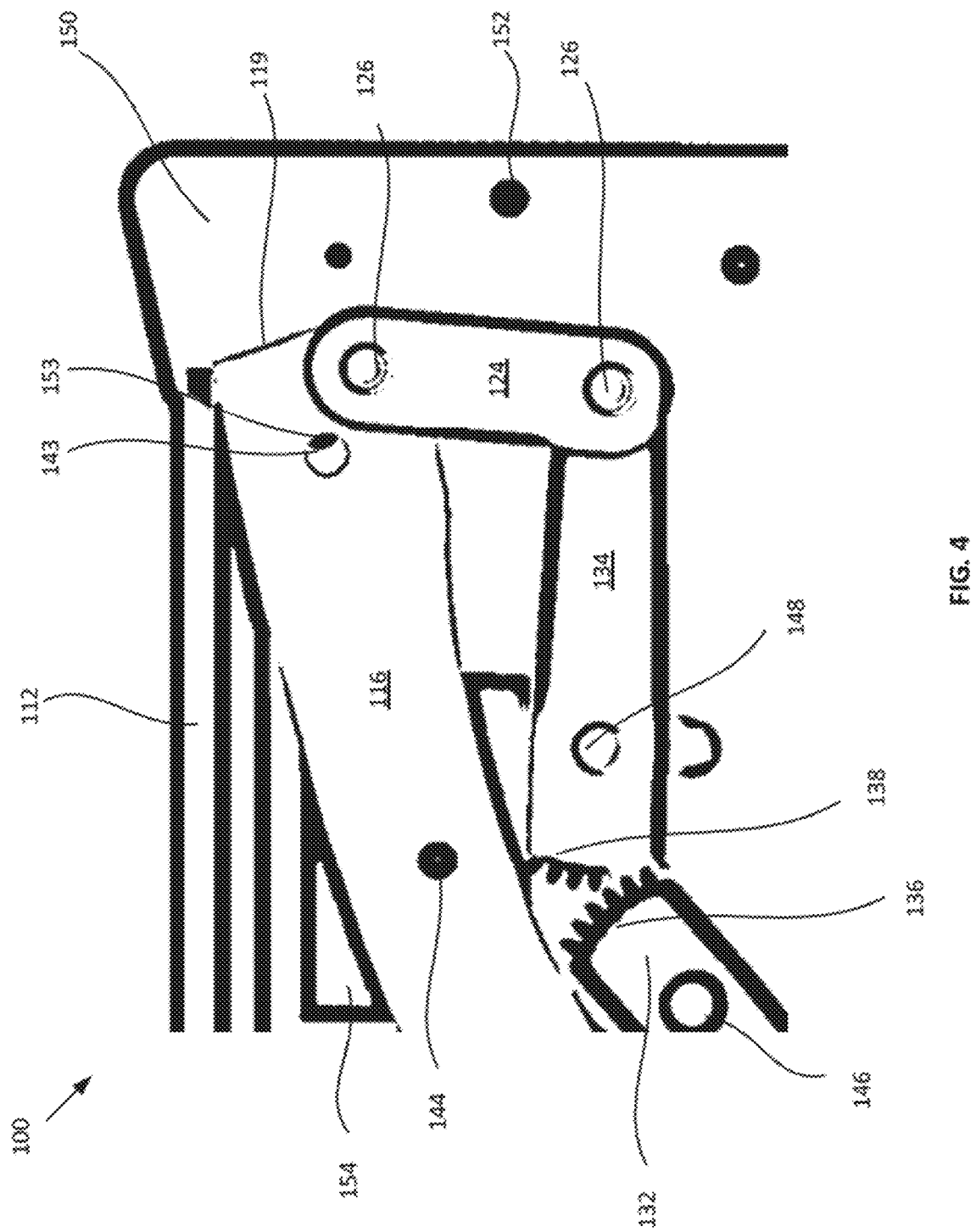
FIG. 4 shows a detailed front view of the label cutter in FIG. 2.

FIG. 4 shows a close-up view of the label cutter 100 as viewed from the front. When the blade 116 is positioned in the right-most extremity, the corner of the blade 116 between the second edge 119 and the cutting edge 118 is aligned with the end of the platen 112. It is at the end of the blade 116 that blade 116 stops rolling on the platen 112 (i.e. at the end, the blade 116 pivots about its corner). This allows cutting across the whole length of the blade 116, i.e. across all the consecutive portions along the cutting edge 118 of the blade 116. As shown, the second force applicator 124 is pivoted to be in a non-vertical position. In the same way, though not shown in FIG. 4, when the blade 116 is positioned in the left-most extremity, the corner of the blade 116 between the first edge 117 and the cutting edge 118 of the blade 116 is aligned with the end of the platen 112 (i.e. at the end, the blade 118 pivots about its corner). Likewise, this allows the cutting to be across the entire surface of the blade 116 cutting edge 118, i.e. across all the consecutive portions along the cutting edge 118 of the blade 116. In this arrangement, the first force applicator 122 is arranged non-vertically.

Figure 5:
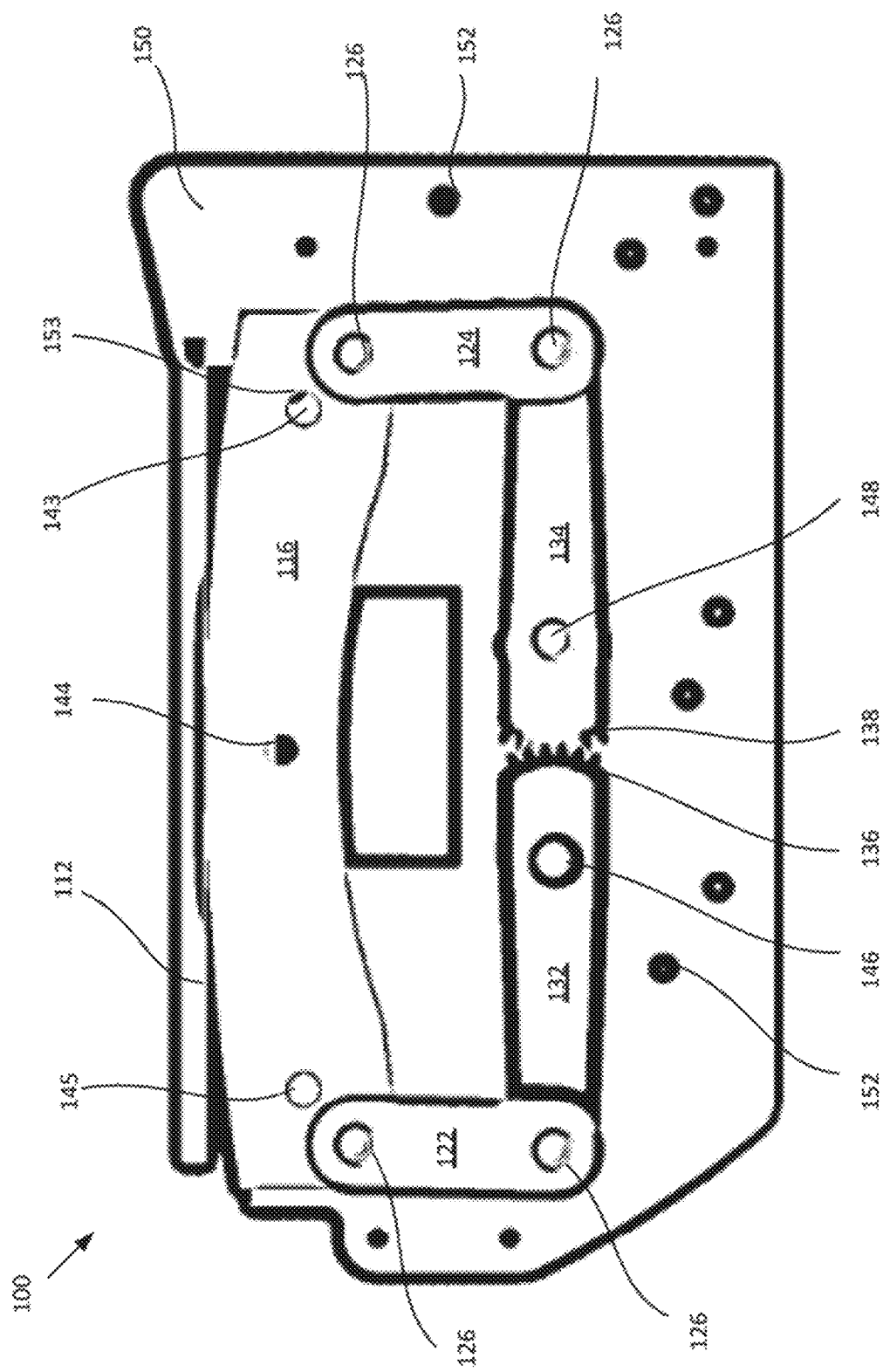
FIG. 5 is a front view of the label cutter in FIG. 2 in a second configuration.

FIG. 5 shows a label cutter 100 in a neutral position. where a central portion of the blade 116 is closer to the platen 112 than portions along the cutting edge 118 of the blade 116 towards the first end 117 and the second end 119. In this configuration, the first gear arm 132 and the second gear arm 134 are parallel to and in line with one another. The first gear arm 132 is coupled to a first force applicator 122 via a pin 126, about which the first force applicator 122 and the first gear arm 132 can pivot relative to one another. The second gear arm 134 is coupled to a second force applicator 124 via a pin 126, about which the second force applicator 124 and the second gear arm 134 can pivot relative to one another. In the neutral position as illustrated, the first force applicator 122 and the first gear arm 132 are substantially perpendicular to one another, the first force applicator 122 in this example being substantially vertical. Also in the neutral position as illustrated, the second force applicator 124 and the second gear arm 134 are substantially perpendicular to one another, the second force applicator 124 being substantially vertical.

Figure 6:
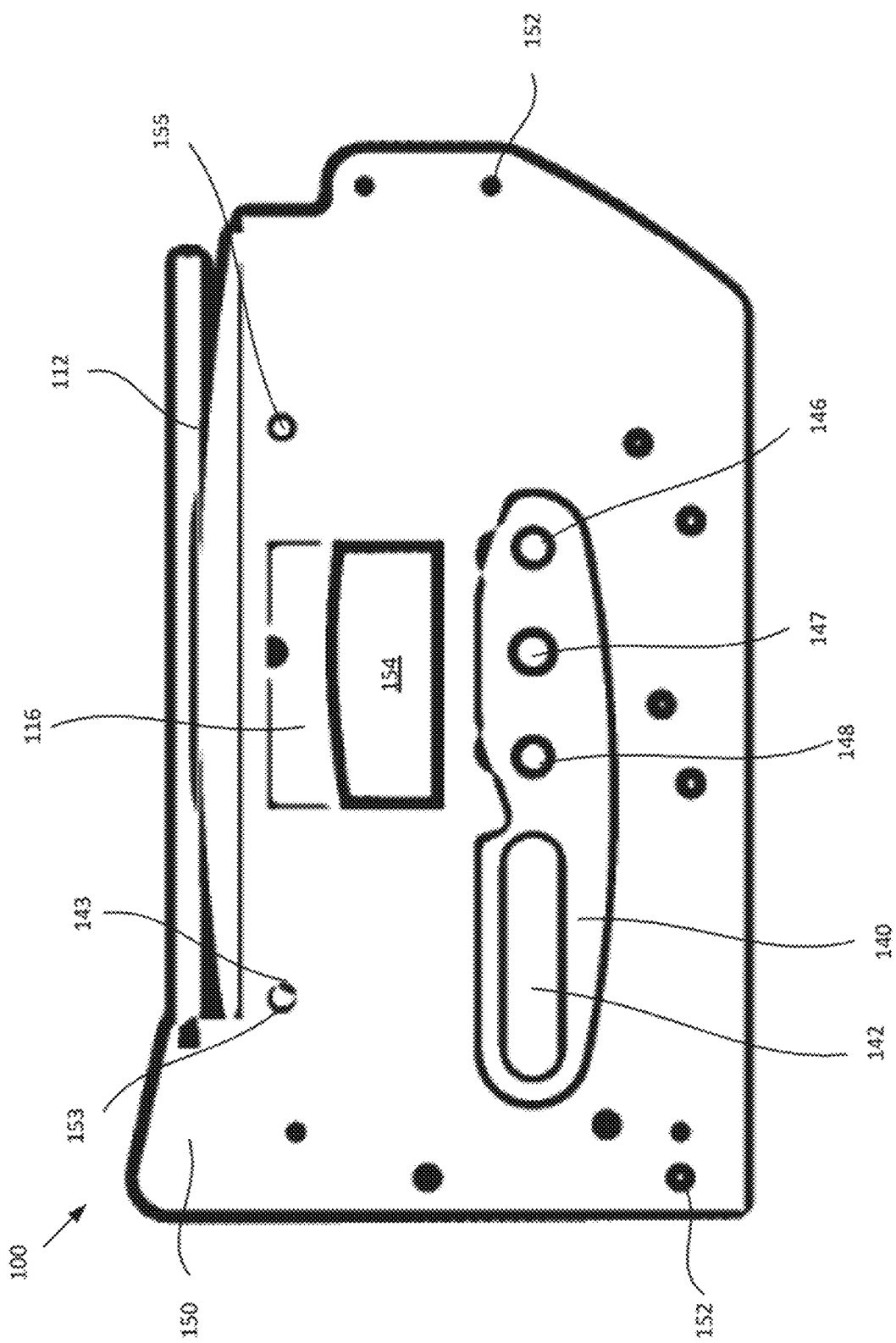
FIG. 6 is a rear view of the label cutter in FIG. 5.

FIG. 6 is a rear view of the label cutter 100 in the neutral position, generally as described above with reference to FIG. 5. A handle 140 is provided and positioned horizontally such that handle aperture 148 aligns with pivot point 148, and handle aperture 146 aligns with pivot point 146. A pin (not shown) is received through handle aperture 148 and pivot point 148. An additionally pin (not shown) is received through handle aperture 146 and pivot point 146 so as to couple the handle with both the first gear arm 132 and the second gear arm 134. The handle 140 is further provided with a receiving portion 142 that is that is designed for a user to grip and turn the handle 140. In other examples, it is envisaged that the handle is driven by a pin and crank (not shown). Additionally or alternatively, it is envisaged that the handle may be driven by a power source such as, but not limited to a DC motor or a stepper motor (not shown).

Figure 7:
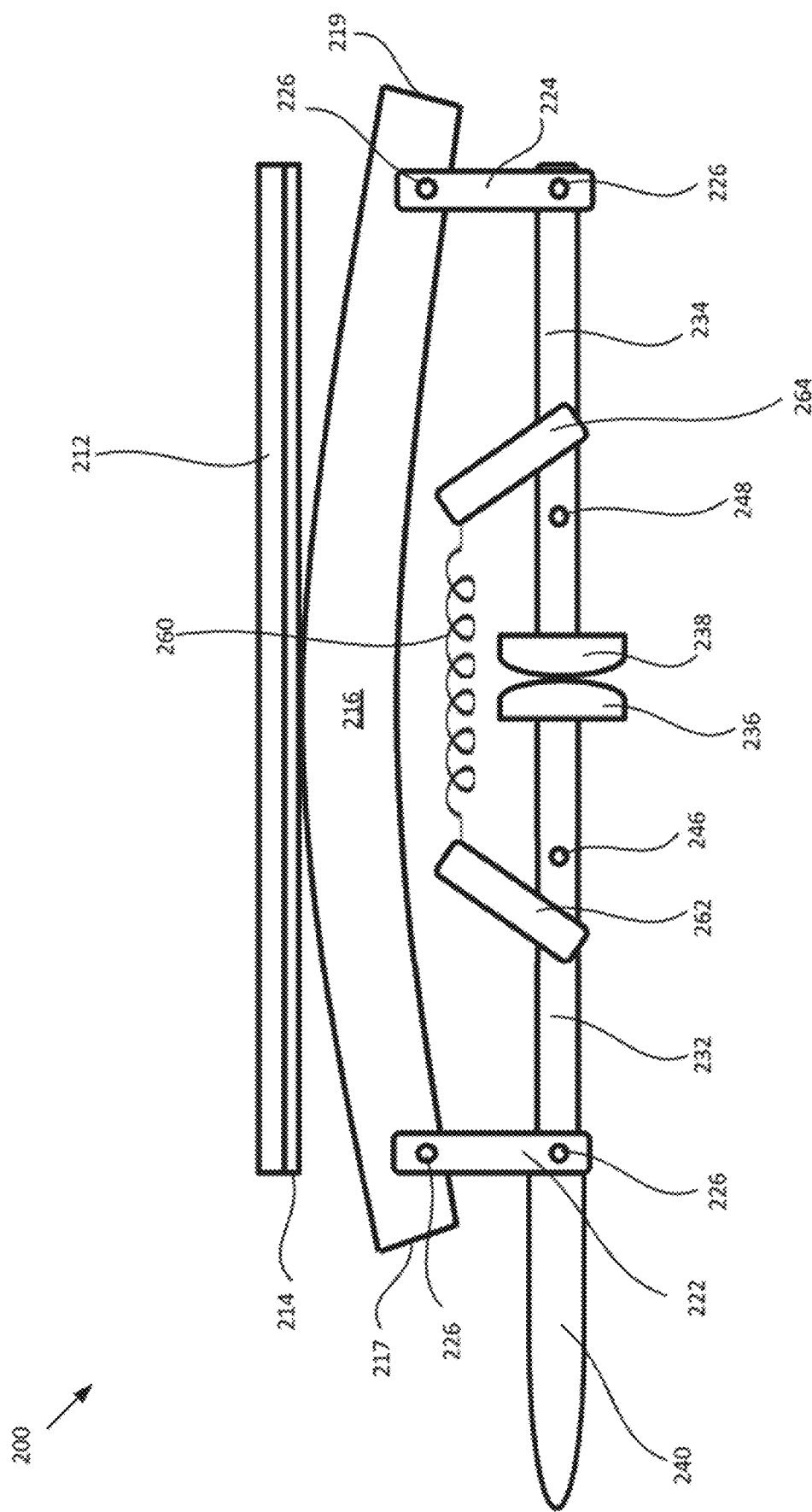
FIG. 7 is a schematic view of a label cutter according to a further embodiment.

FIG. 7 shows a label cutter 200 that is substantially the same as that in FIG. 1 and thus, aspects and features akin to those in FIG. 1 will not be described again in detail. The first gear arm 232 is further provided with a first extension member 262 that is fixedly mounted to the first gear arm 232. The second gear arm 234 is provided with a second extension member 264 that is fixedly mounted to the second gear arm 234. In this example, the first extension member 262 and the second extension member 264 are fixedly mounted to the respective gear arms 232,234. However, it is envisaged that they may instead be pivotably mounted about their respective gear arms 232,234. A resilient member, which in this example is a coil spring 260, is attached to the ends of the extension members 262,264 distal the ends attached to the gear arms 232,234. Thus, a biasing force is provided so as to resilient bias the assembly back to the neutral position hereinbefore described. That is, the coil spring 260 in the natural position of the label cutter 200 is in a compressed state. When the label cutter 200 moves from the neutral position towards either the left-most extremity position or the right-most extremity position, i.e. away from the natural position, the coil spring 260 extends and provides a restoring force tending towards the compressed state, i.e. the neutral position. In this example, the extension of the coil spring 260 over the cutting cycle is substantially less than the initial extension of the coil spring 260 when the coil spring 260 is assembled. This provides a constant coupling force at points denoted 246 or 248. However, it should be appreciated that in some other examples, the extension of the coil spring 260 over the cutting cycle may be more than the initial extension of the spring 260 as assembled. It is further envisaged that the resilient member could be a clock spring, or another means that is capable of providing a restoring force.

Figure 8:
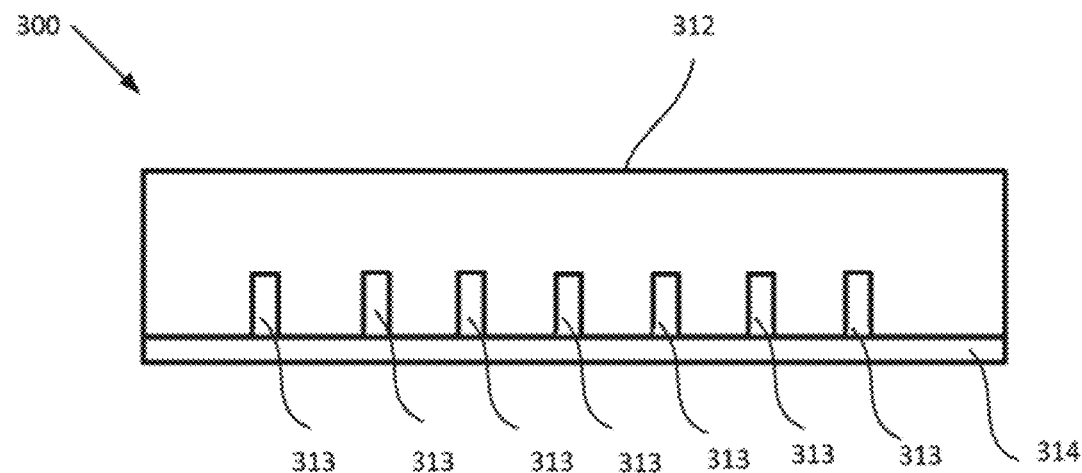
FIG. 8 is a schematic of the platen of the label cutter according to an embodiment.
Figure 9:
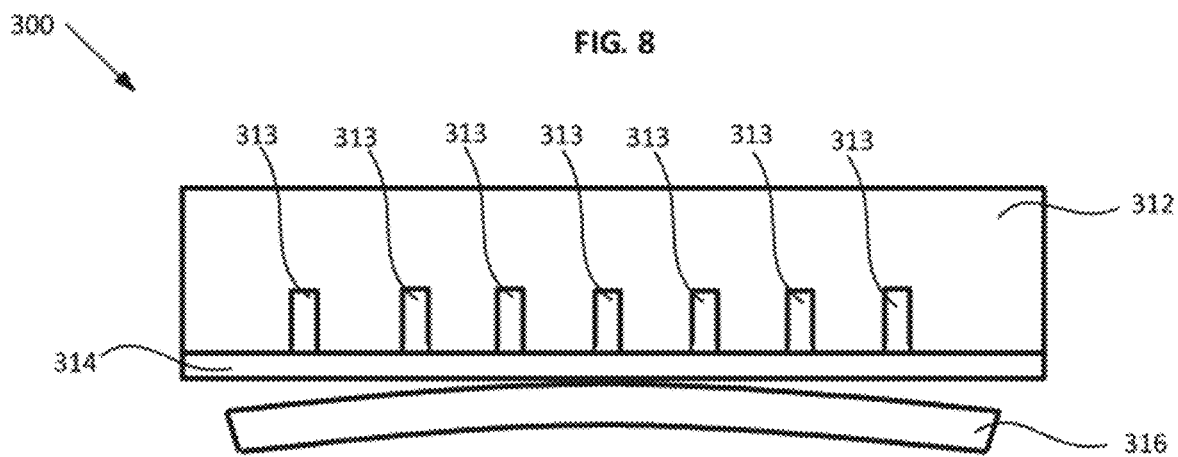
FIG. 9 is a schematic view of a label cutter incorporating the platen in FIG. 8, in a first configuration.
Figure 10:
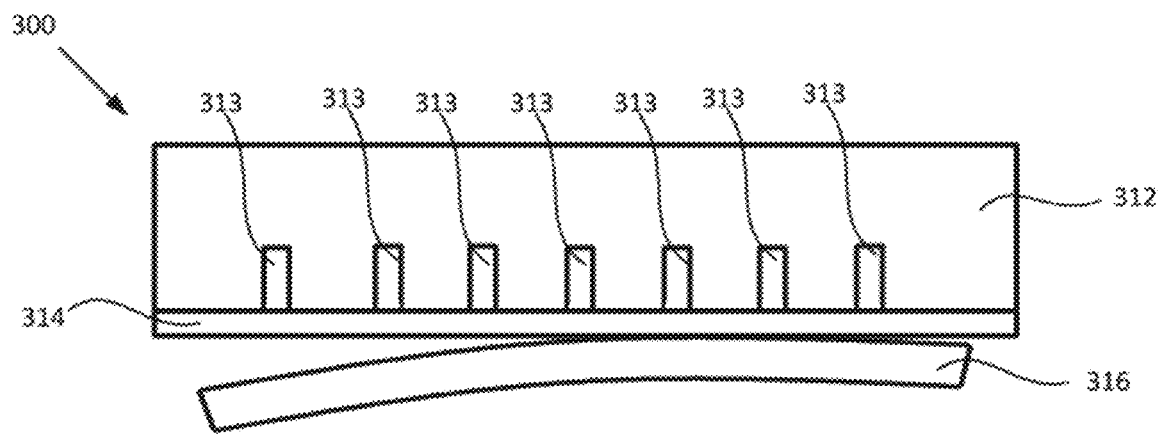
FIG. 10 shows a schematic view of the label cutter in FIG. 9, in a second configuration.

Referring now to FIG. 8, FIG. 9, and FIG. 10, there is provided a label cutter 300 showing only a platen 312 and label 314. The platen 312 in this arrangement comprises a series of grooves 313 along its surface on which the label 314 is placed. The grooved surface of the platen 312 extends in a direction that is parallel to the longitudinal axis of the platen 312. When a blade (see FIG. 9, 316) rollingly engages with the platen, a partial cut can be formed across the width of the label 314. More specifically, the blade (not shown) exerts a force onto the platen 312 as the blade (not shown) rolls across its surface. When the blade (not shown) reaches a portion of the platen 312 that has a groove surface, the blade cannot exert a force to cut the label 313 that is positioned on the surface of the groove 313. Therefore, there is produced a label 314 that is only partially cut. It is envisaged that the platen 312 could be a rotatable cylinder having an array of grooves 313 positioned in the longitudinal axis on its surface. Thus, the rotatable cylinder platen (not shown) can be selectively rotated so as to selectively provide a platen 312 that may or may not have grooves 313. This allows the label 314 to be partially cut or fully cut, depending on the desired cut for the label 314. It should also be appreciated that perforated cuts of various shapes and sizes can be provided by altering the profile of the grooves.

Figure 11:
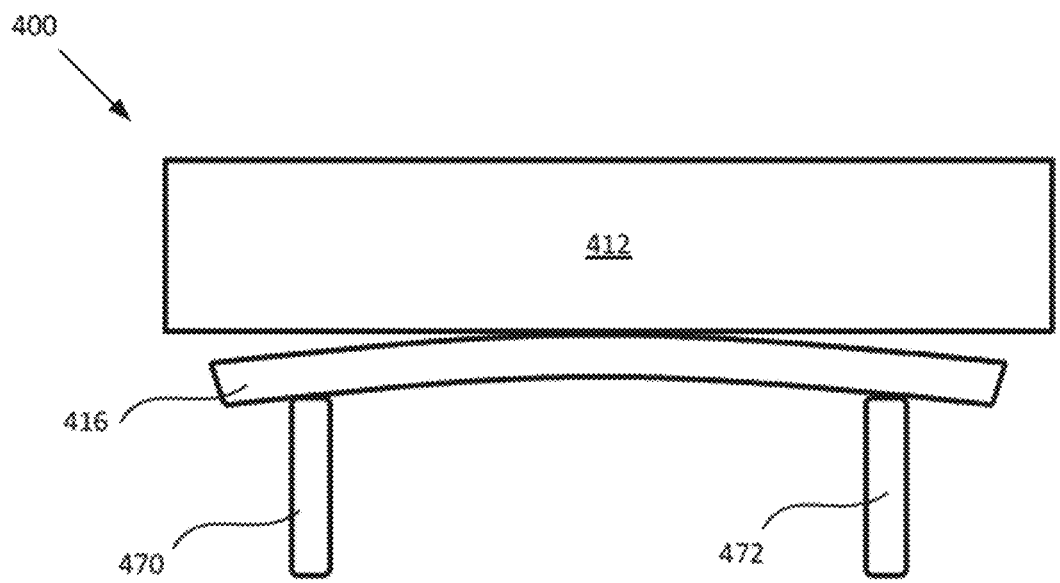
FIG. 11 shows a schematic view of a label cutter according to a still further embodiment.

FIG. 11 illustrates a label cutter 400 having a platen 412 and blade 416 as hereinbefore described with reference to FIG. 1, and so will not be described again in detail. A first force applicator 470 is provided on a first side of the blade 416. A second force applicator 472 is provided on a second side of the blade 416. Each of the first 470 and second 472 force applicators are configured to provide a vertical force to the blade 416. By alternating the movement of the first force applicator 470 and the second force applicator 472, the curved cutting edge of the blade 416 is rolled along the platen 412. More specifically, alternated application of force vertical from the first force applicator 470 and second force applicator 472 provides a rocking or rolling motion of the blade 416 onto the platen 412 so as to cut a label (not shown) therebetween. However, vertical force application exerts uneven force on the platen 412. In some examples, the vertical applicator of force from the blade 416 onto the platen 412 creates wear in the platen 412 at the location of the force application by the respective force applicators 470,472.

Figure 12:
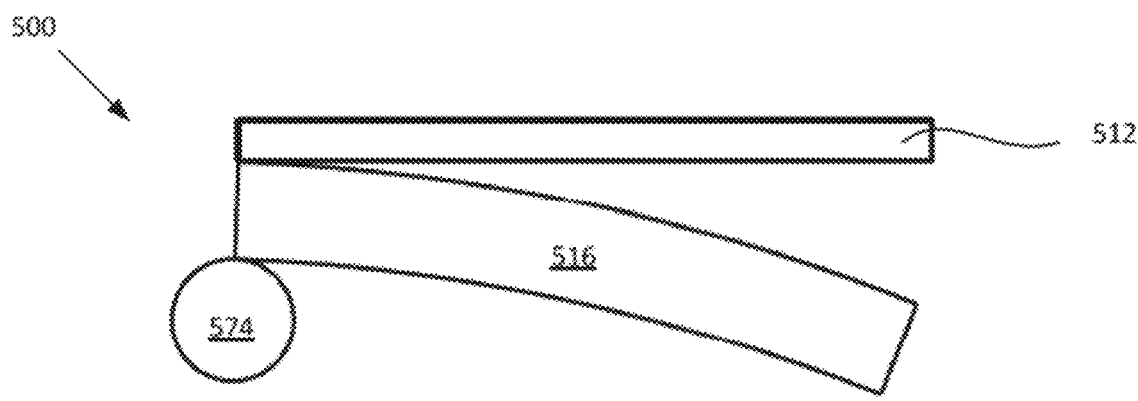
FIG. 12 shows a schematic view of a label cutter according to a yet still further embodiment in a first configuration.
Figure 13:
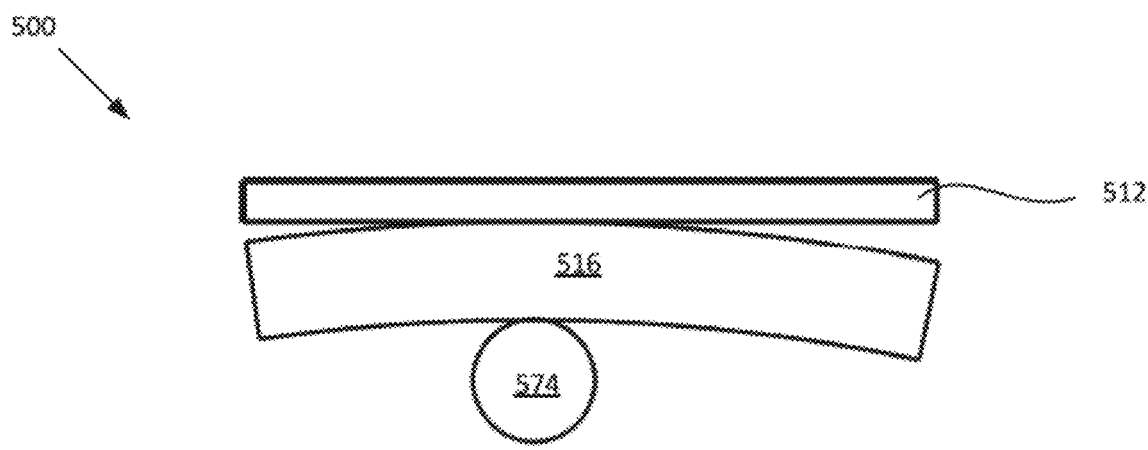
FIG. 13 shows a schematic view of the label cutter in FIG. 12, in a second configuration.

FIGS. 12 and 13 illustrate a label cutter 500 having a platen 512 and blade 516 as hereinbefore described with reference to FIG. 1, and so will not be described again in detail. A force applicator 574 is provided in the form of a roller having a longitudinal axis perpendicular to the longitudinal axis of the platen 512 (i.e. into the page). The roller 574 is moveable along the length of the blade 516 following a path that is substantially parallel to the cutting edge of the blade 516, and perpendicular to its longitudinal axis. In some examples, the roller 574 moves parallel to the supporting edge of the blade 516. As the roller 574 moves along the blade 516, the roller 574 exerts a force onto the supporting edge of the blade 516 in the direction of platen 512. The force exerted by the roller 574 is thus transferred through the body of the blade 516 towards the curved cutting edge of the blade 516. Thus, a label (not shown) which is placed between the cutting edge of the blade 516, and the platen 512 is cut by the blade 516. In some examples, the roller 574 exerts a force on the supporting edge of the blade 516 that is constant as it moves along the blade 516. In some examples, the roller 574 is spring loaded so as to be resiliently biased against the platen 512. This provides a constant force to the bottom curved edge of the blade 516. The force is transferred through the blade 516 to the cutting edge. When the roller 574 travels in a straight line parallel to the platen 512, the blade 516 is caused to roll along the platen 512 so as to provide a constant cutting force to the blade 516 cutting point at the point of travel.

Figure 14:
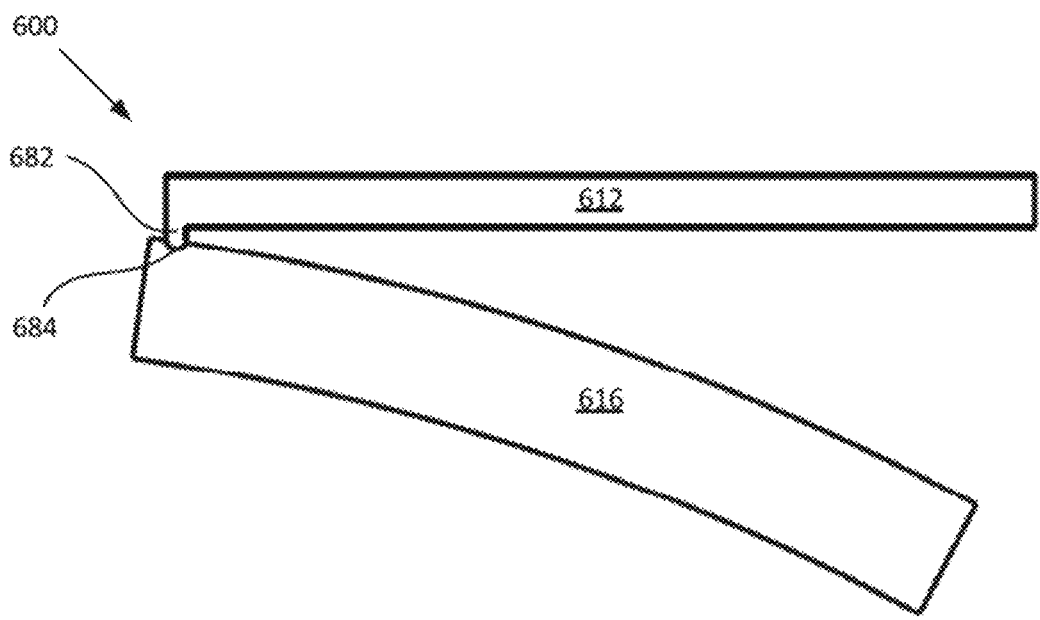
FIG. 14 shows a schematic view of a label cutter according to another embodiment, in a first configuration.
Figure 15:
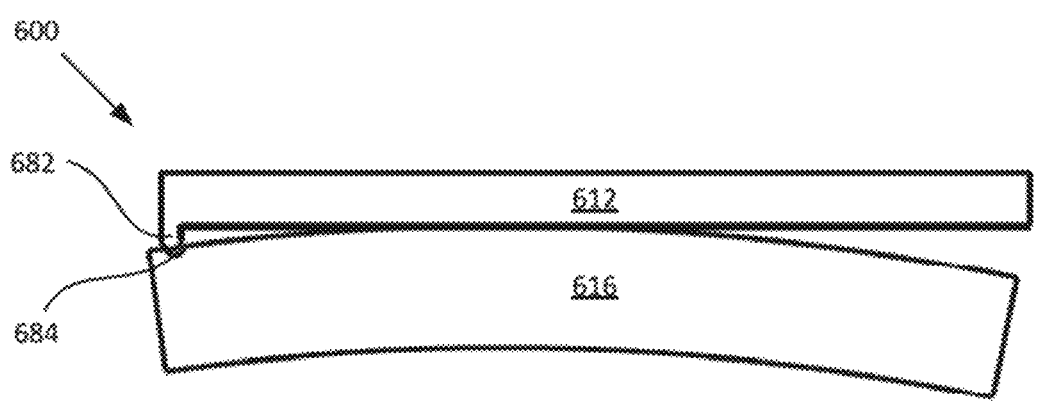
FIG. 15 shows a schematic view of the label cutter in FIG. 14, in a second configuration.

FIGS. 14 and 15 show a label cutter 600 comprising a platen 612 and a blade 616. The platen 612 in this example is provided with a notch 682 and the blade 616 is provided with a corresponding groove or recess 684. The notch 682 and the recess 684 provide a gap in between them to allow label (not shown) or paper (not shown) to be fed between the platen 612 and the blade 616. This allows loading of the material to be cut, with greater ease. It is envisaged that a similar arrangement to that in FIGS. 14 and 15 can be provided, having a label cutter comprising a platen and a blade. The platen in such envisagement is provided with a recess and the blade is provided with a corresponding. The recess and the notch provide a gap therebetween, allowing label, paper, or any other loading material (not shown) to be fed between the platen and the blade. In some examples, it is envisaged that the label or paper is guided over the platen in a trajectory which is appropriate such that the edge of the paper is used to scrape the platen to remove the build-up of adhesive. The scraping action provided by the paper edge may be in the forward feed, or in the backward feed.

Figure 16:
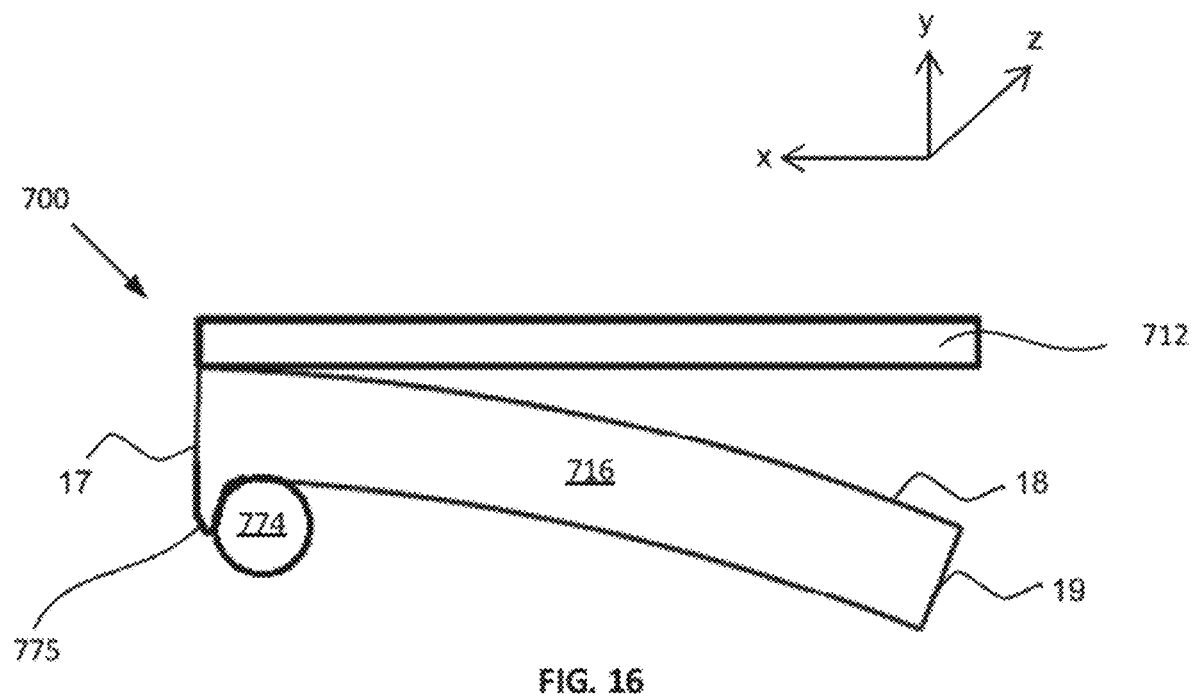
FIG. 16 shows a schematic view of a label cutter according to a further embodiment in a first configuration.
Figure 17:
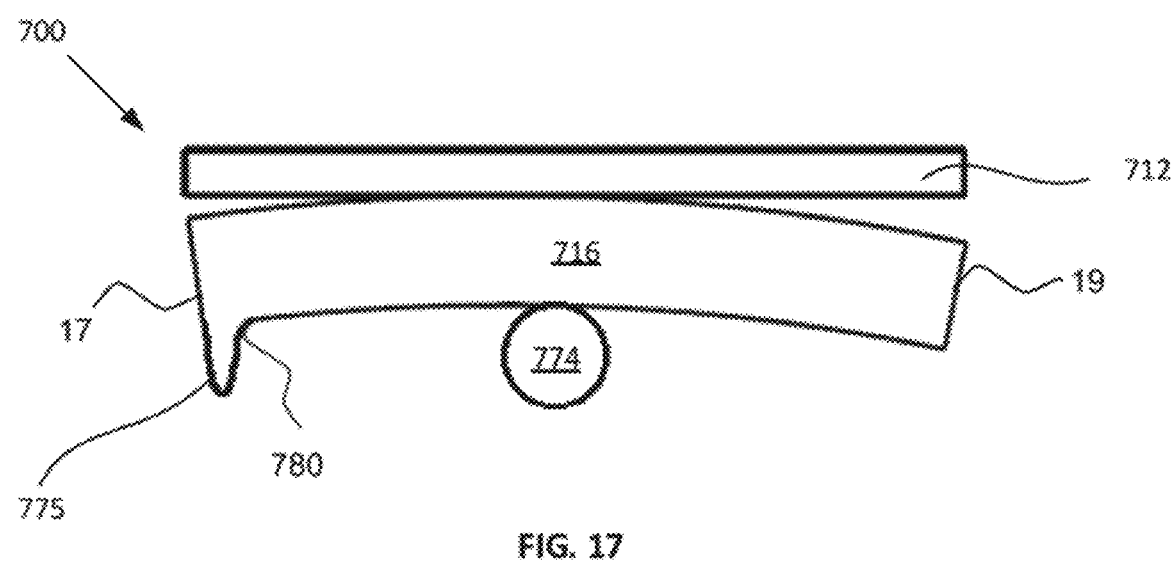
FIG. 17 shows a schematic view of the label cutter in FIG. 16, in a second configuration.

FIGS. 16 and 17 illustrate a label cutter 700 having a platen 712 and blade 716 as hereinbefore described with reference to FIGS. 12 and 13. The blade 716 is provided with an engaging portion 775 at the first end of the blade 716. The blade 716 comprises the cutting edge 18, the first end 17 and second end 19. The engaging portion 775 may be provided in the form of a hook. The engaging portion 775 may have at least one surface which is curved or hook-shaped, which may be a surface casing inwardly along the blade for being contacted by the force applicator as will be explained. The engaging portion 775 protrudes from the bottom edge of the blade 716. The engaging portion 775 is at an opposing side of the blade 716 from the cutting edge 18. In some examples, the engaging portion 775 alternatively or additionally protrudes from the second end of the blade. The engaging portion 775 provides a locating function in order to position the roller 774. That is, by providing the engaging portion 775, the extremity (or extremities) of the path of the roller 774 is (are) predetermined so as to affect the cut.

FIG. 16 illustrates axes x, y and z. The roller 774 may extend along the z direction. The blade 716 may extend parallel to the x-y plane. The platen 712 may extend parallel to the x-z plane. The +y direction may be considered as 'towards the platen 712' and the −y direction may be considered as 'away from the platen 712'.

The engaging portion 775 may form a corner 780 on the blade 716, as shown in FIG. 17. The force applicator, such as the roller 774, may move along the opposing side of the blade 716 from the cutting edge 18 to contact the engaging portion 775, at a contact point as shown in FIG. 16. The contact point may define a pivot position. For example, the pivot position may be the corner 780.

When the roller 774 contacts the hook 775, a small amount of additional travel towards the hook 775 causes the roller 774 to urge further towards the hook 775. The corner 780 may force the roller 774 to move along the engaging portion 775. This urging of the roller 774 towards to hook 775 causes the blade 716 to rotate about the corner 780 of the blade 716. This movement pivots the blade 716 around the corner 780. In this way, the blade 716 is caused by the force applicator 774, such as the roller 774, to rotate away from the platen 712 by rotating about the pivot position.

In the embodiment shown in FIG. 16, when the blade 716 is in the x-y plane, the rotation away from the platen 712 may be considered as a clockwise or downwards rotation. It will be appreciated that the rotation of the blade 716 away from the platen 712 by rotating about the pivot position may cause the first end 17 to move in the +y direction and the second end 19 to move in −y direction, such that the cutting edge 18 of the blade 716 to move away from the platen 712.

The downward movement (i.e. the rotation of the blade 716 away from the platen 712) of the blade increases the space between the blade 716 and the platen 712 for the adhesive or label (not shown) to be fed past the blade 716.

The hook 775 also provides the function of retaining the blade 716. The hook 774 of the blade 716 is received in a housing (not shown) below the blade such that when the roller 775 moves along the blade, the hook 775 engages a portion of the housing below. The hook 775 repositions the blade 716 each stroke (passing of the roller 774 along the blade 716) to prevent the misalignment of the blade. That is, the blade 716 is prevented from drifting out of position when effecting the cutting motion of the blade 716.

Figure 18:
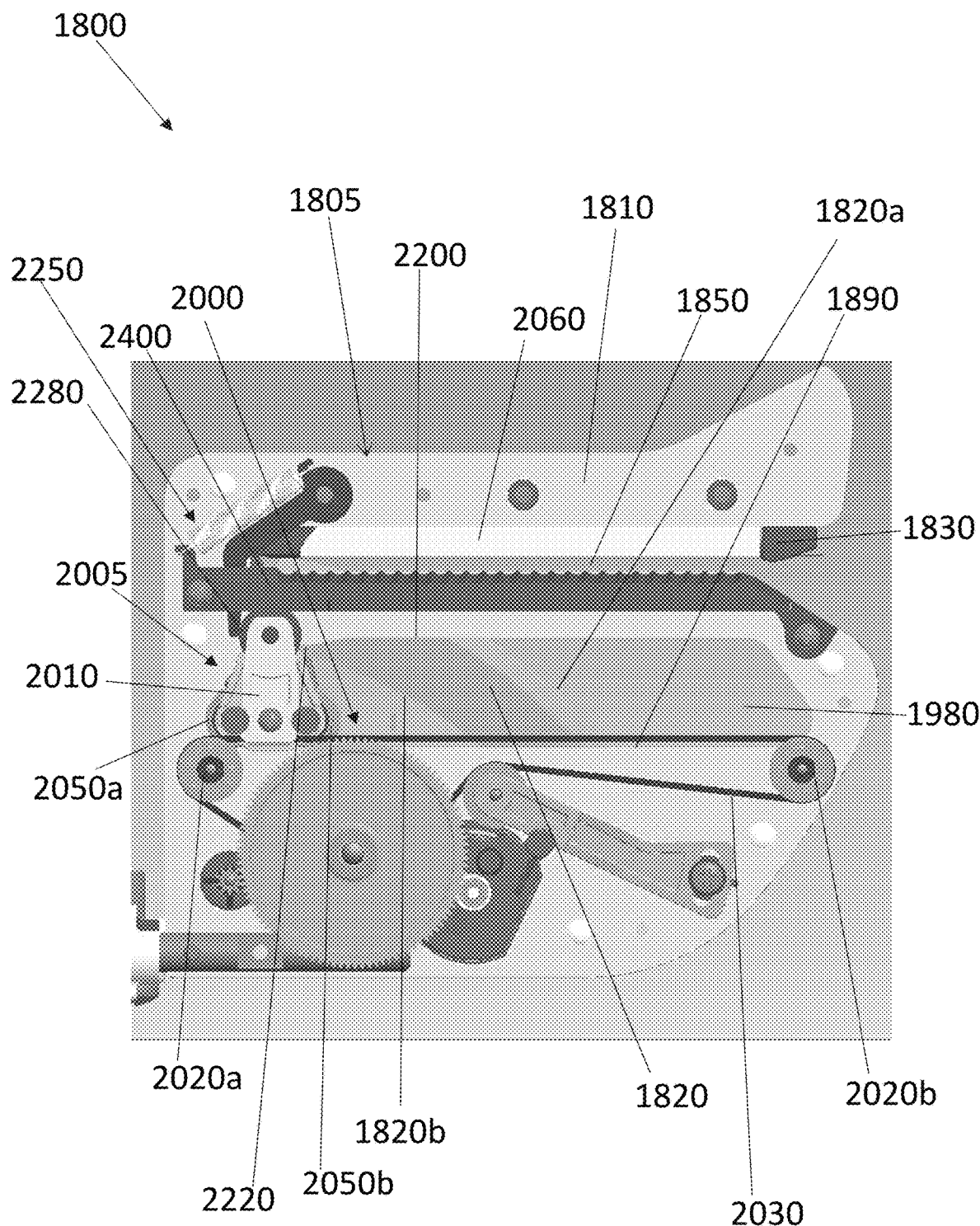
FIG. 18 shows a side of view of a label cutter according to an embodiment of the invention.
Figure 19:
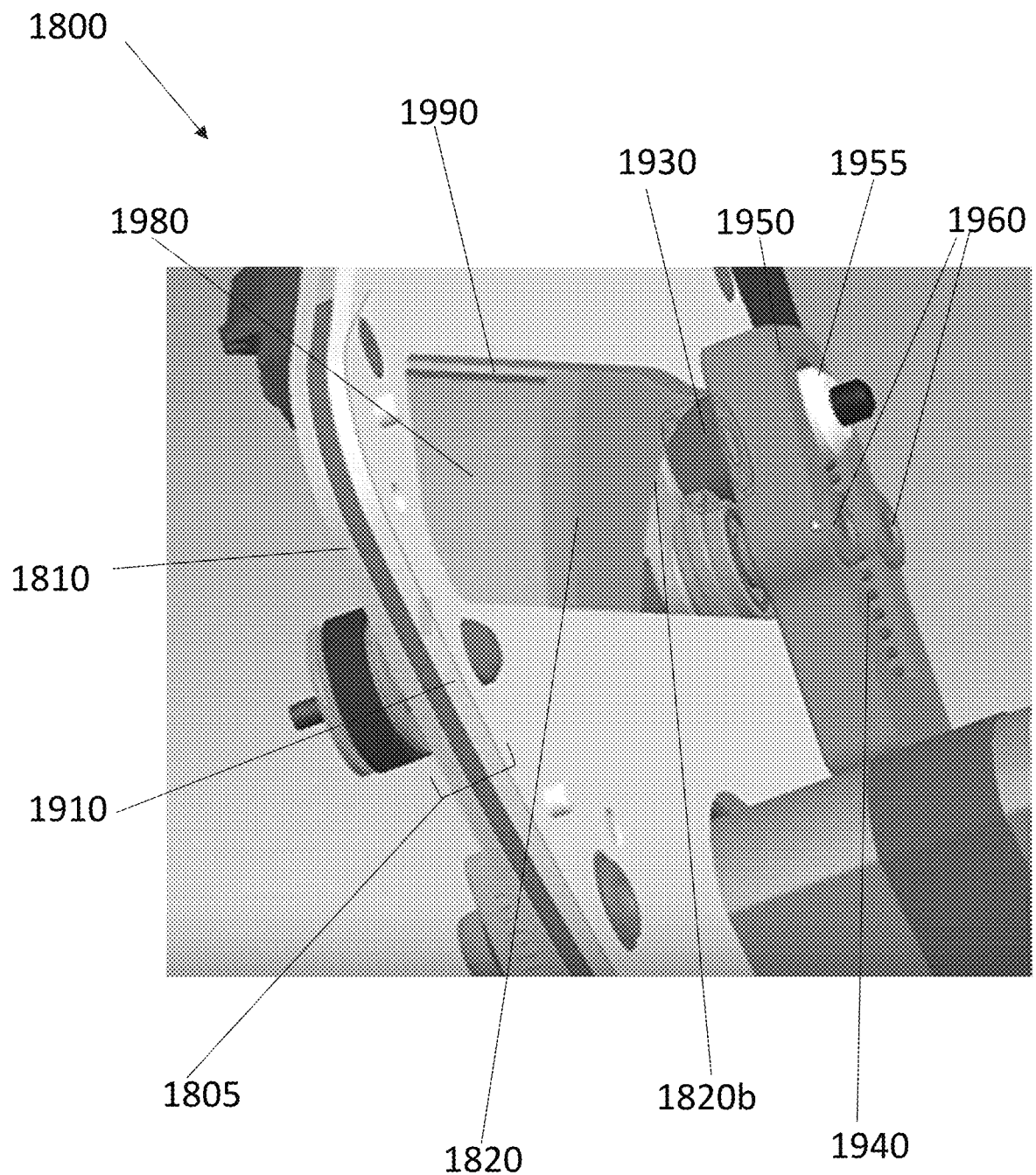
FIG. 19 illustrates a view of the label cutter of FIG. 18 rotated approximately 110 degrees anticlockwise to an axis running down the page.

FIGS. 18 and 19 illustrate a label cutter 1800 with a roller 1930 which acts as a force applicator, as in the embodiments described above with reference to FIGS. 12 and 13. The roller 1930 is not shown in FIG. 18 but is shown in FIG. 19. The label cutter 1800 is shown in side-view in FIG. 18 and is shown rotated approximately 110 degrees anticlockwise to an axis running down the page of FIG. 18. FIGS. 20-26 also provide further views of various parts of the label cutter 1800 as will be explained.

The label cutter 1800 comprises a frame indicated generally by reference numeral 1805. The frame 1805 provides a support for components of the label cutter 1800 as described below. The frame 1805 may comprise a first side frame 1810 and a second side frame 1910. The first and second side frames 1810, 1910 are laterally spaced-apart to form a channel 1990 there-between. The frame 1805 may comprise an aperture 1980. The aperture 1980 is provided through both the first and second side frames 1810, 1910. The aperture 1980 comprises at least a first edge 2200 and a second edge 1890. The first and second edges 2200, 1890 are in opposed relation. At least a portion of the first edge 2200, herein referred to as lower portion 2220, is arranged to receive a force from the roller 1930 as will be described below.

The frame 1805 at least partially houses a blade 1820 which is moveably positioned in the channel 1990 (illustrated in FIGS. 19 and 20) between the first side frame 1810 and the second side frame 1910. The channel 1990 retains the blade 1820 and restricts lateral movement of the blade 1820, such that only vertical movement towards and away from a platen 1830 is permitted. The channel 1990 may extend within the frame 1805 above the first edge 2200 and below the second edge 1890 i.e. above and below the aperture 1980. The first side frame 1810 and the second side frame 1910 are substantially parallel to the blade 1820. The blade 1820 may be any blade described above, such as the blade 716 having the engaging portion 775. The blade 1820 comprises a curved cutting edge 1820a and a supporting edge 1820b.

The frame 1805 may be shaped to receive a platen 1830. The platen 1830 is removeably engaged with the frame 1805. In some embodiments, the frame 1805 comprises an elongate opening or slit 1850 in which the platen 1830 is inserted. The platen 1830 may be any platen described above, such as a smooth platen or the platen 312 with the grooved surface as shown in FIGS. 8-10. The platen 1830, when engaged with the frame 1805, is arranged perpendicular to the blade 1820 such that the curved cutting edge 1820a may contact a surface of the platen 1830 as discussed above.

In some embodiments, the platen 1830 is secured to the label cutter 1800 using a platen carrier 2060. The frame 1805 is shaped to receive the platen carrier 2060 within which the platen 1830 is held. The platen 1830 may protrude from the platen carrier 2060 such that an end of the platen 1830 is accessible to the user to assist with removal. The platen carrier 2060 may be inserted into the elongate opening or slit 1850. The platen 1830 may be removeably engaged with the platen carrier 2060. The platen carrier 2060 may be removeably engaged with the frame 1805.

In some embodiments, the platen 1830 comprises one or more grips which can be held by the user when removing and inserting the platen 1830 to improve user safety and convenience. A grip is arranged at one end of the platen 1830, for example in the form of a textured pattern on the platen 1830. When the platen 1830 is held within the platen carrier 2060, the grip is arranged at the end of the platen 1830 protruding from the platen carrier 2060.

The label cutter 1800 comprises a shuttle 2005 which is moveable in relation to the frame 1805. The shuttle 2005 is shown in FIG. 18 in the 'home position'. The label cutter 1800 comprises at least one track along which the shuttle is moveable in an axis parallel with a surface of the platen 1830. In the illustrated embodiment, the shuttle 2005 is moveable along the second edge 1890 of the aperture 1980 forming part of the track. The shuttle 2005 carries the roller 1930 such that movement of the shuttle 2005 causes movement of the roller 1930 along the blade 1820, which in turn causes vertical movement of the blade 1820. The motion of the shuttle 2005 is parallel to the longitudinal axis of the platen 1830. The track along which the shuttle 2005 is moveable comprises an upper track 2400. In the illustrated embodiment, the upper track 2400 is mounted upon an outer surface of one of the side frames 1810, 1910. The upper track 2400 is arranged to engage with a portion of the shuttle 2005 to stabilise the shuttle 2005 as it moves along the second edge 1890. That is, the second edge 1890 and the upper track 2400 form a pair of tracks or guides along which the shuttle 2004 is moveably mounted and retained there-between. A movement mechanism 2000 indicated generally by reference numeral 2000 is arranged to move the shuttle 2005 in first and second opposed directions along the guides, which in turn causes movement of the roller 1930 and will described in more detail below. The movement mechanism 2000 may comprise at least one pulley 2020a, 2020b and a belt 2030 or chain.

The label cutter 1800 may comprise a locking mechanism indicated generally by reference numeral 2250. The locking mechanism 2250 is arranged to lockingly engage the platen 1830 with the frame 1805 to prevent unintentional removal of the platen 1830. In some embodiments, the locking mechanism 2250 is arranged to prevent the platen 1830 from being removed from the frame 1805 unless the blade 1820 and the shuttle 2005 are in the 'home position'.

As shown particularly in FIG. 19, the shuttle 2005 carries a biasing means for biasing the roller 1930 against the blade 1820, urging the blade toward the platen 1830. In the illustrated embodiment, the biasing means comprises a roller spring 1940. The roller spring is arranged at the second side 1910 of the frame 1805. The shuttle 2005 supports a roller guide 1950 at an opposite side of the frame 1850 to the shuttle 2005. One or more supports 1960, in the illustrated embodiment a pair of supports 1960, extend through the aperture 1980 from a body of the shuttle to support the roller guide 1950. The roller guide 1950 comprises a generally vertical channel within which the roller spring 1940 is located. The roller spring 1940 is arranged within the channel against an inner end face of the channel at one end. A carrier 1955 is moveably located within the channel. The carrier 1955 supports an axle of the roller 1930, such that the roller 1930 is moveable toward and away from the blade 1820 and the platen 1830. The roller spring 1940 is arranged to contact the carrier 1955 to bias the carrier 1955 and roller 1930 in a direction toward the blade 1820. The roller spring 1940 applies force between the end face of the channel and the carrier 1955.

The roller spring 1940 causes the roller 1930 to be spring loaded so as to be resiliently biased toward the platen 1830. The roller spring 1940 is arranged to provide a constant force to the supporting edge 1820b. The force is transferred through the blade 1820 to the cutting edge 1820a. When the roller 1930 moves in a line substantially parallel to the longitudinal axis of the platen 1830, the roller 1930 exerts a force on the supporting edge 1820b which causes the curved cutting edge 1820a of the blade 1820 to move along the platen 1830 so as to provide the constant cutting force.

The first side frame 1810 and the second side frame 1910 are co-located, and may be attached to each other in some embodiments, in a horizontally spaced apart arrangement using attachment means, such as fasteners, or may be formed from a unitary component. The first side frame 1810 and the second side frame 1910 may be plates, which may be made of metal, such as steel or aluminium. Corresponding apertures in each of the first side frame 1810 and the second side frame 1910 are aligned to form the aperture 1980.

The roller 1930 shown in FIG. 19 may be the roller 574 or roller 774 described above and may be arranged such that the longitudinal axis of the roller 1930 is perpendicular to the longitudinal axis of the platen 1830. The description of the roller 574 in relation to FIGS. 12 and 13 is applicable to the interaction of the roller 1930 interacts with the supporting edge 1820b of the blade 1820 to cut a label (not shown) which is placed between the cutting edge 1820a and the platen 1830. Therefore, the description will not be repeated here for clarity and the reader is directed above.

Figure 20:
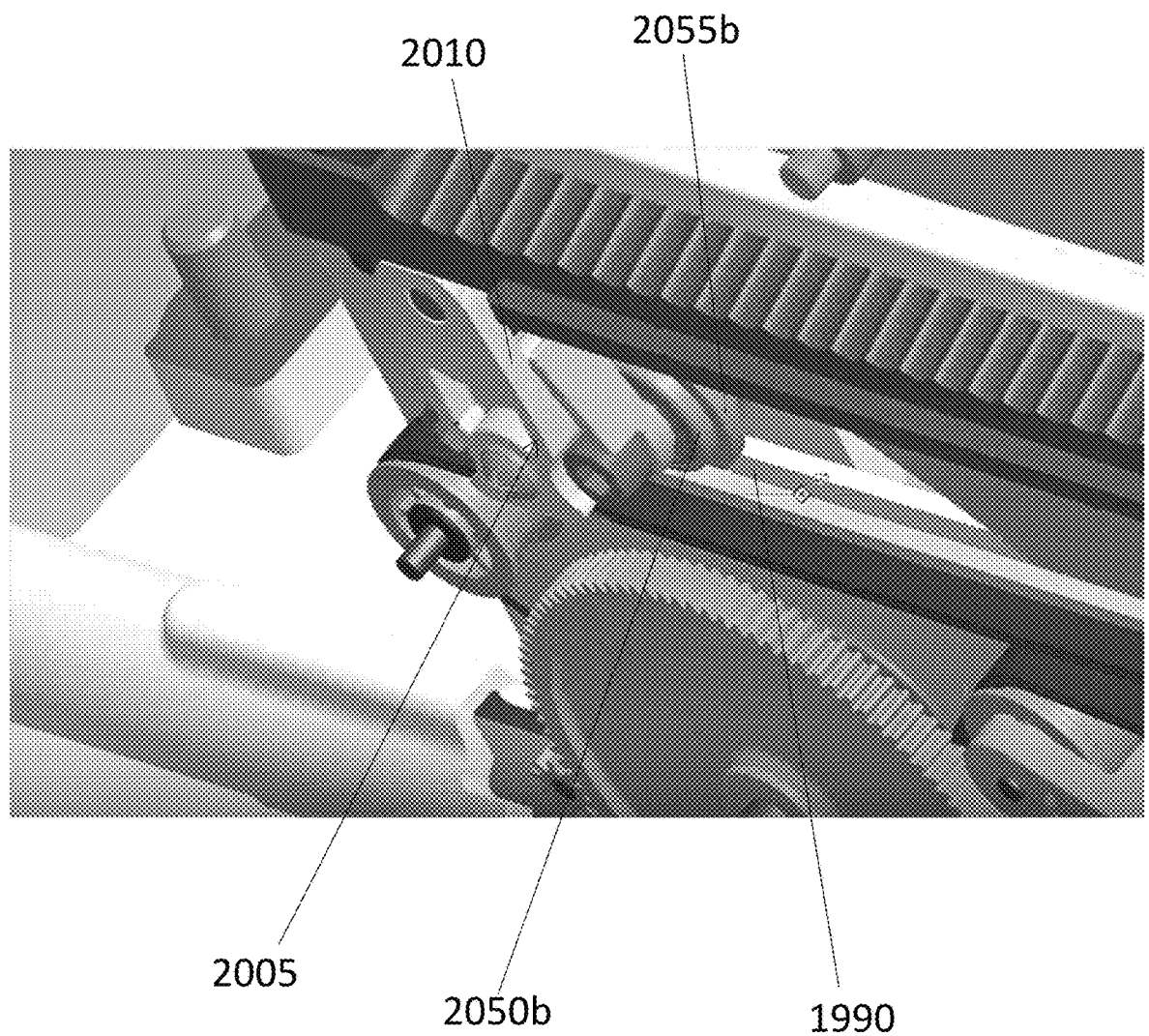
FIG. 20 illustrates a portion of the label cutter of FIG. 18.
Figure 21:
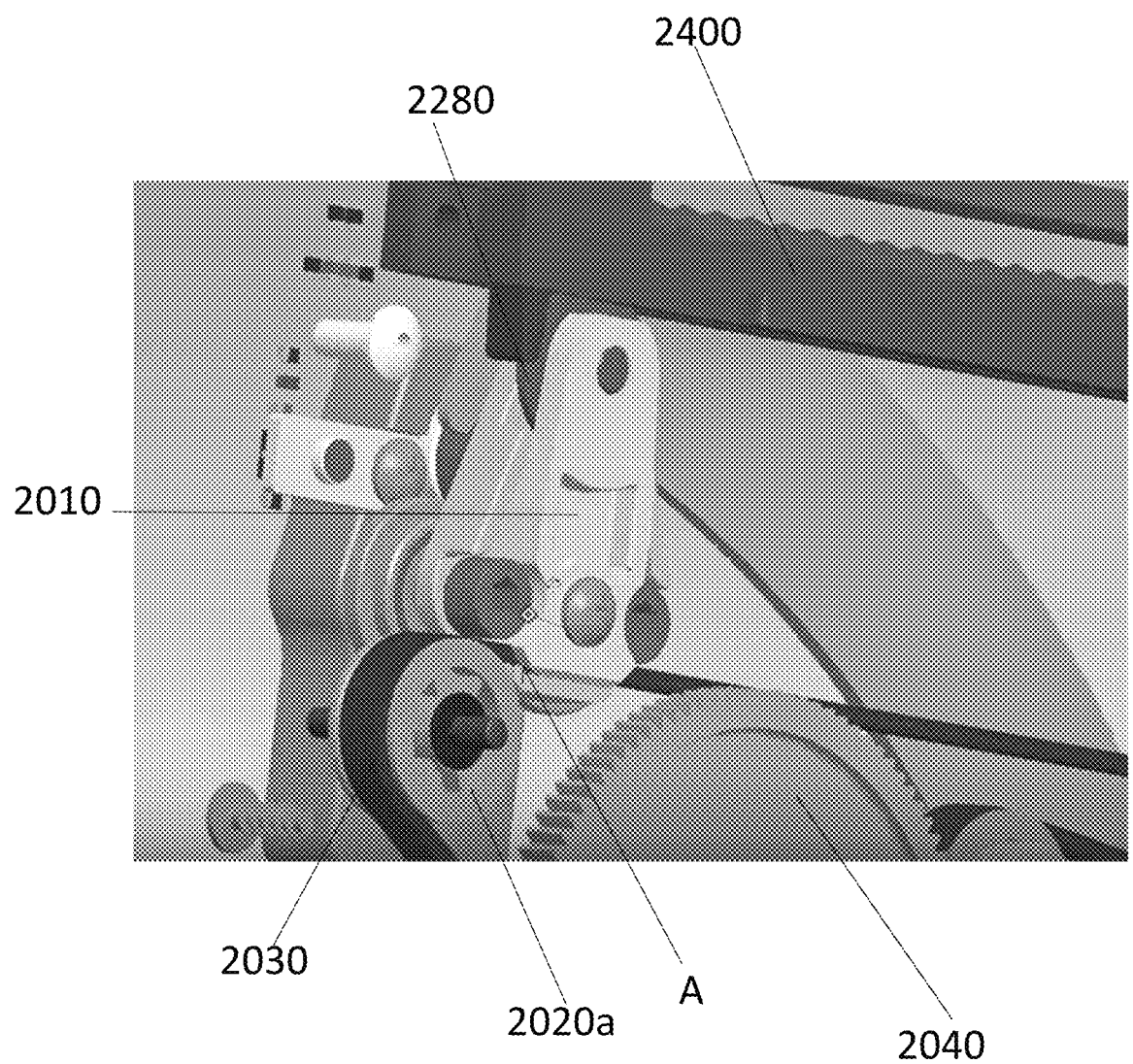
FIG. 21 illustrates a schematic of the label cutter of FIG. 18.
Figure 22:
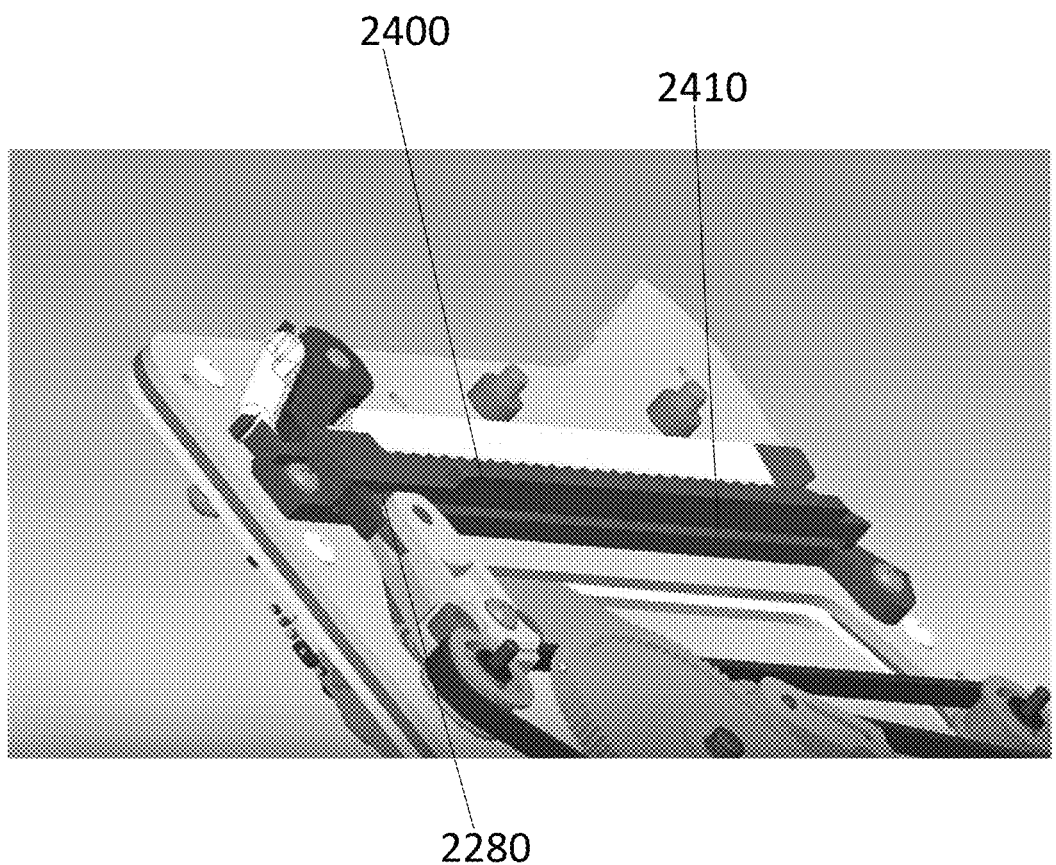
FIG. 22 illustrates a portion of the label cutter of FIG. 18.

Referring now to FIGS. 20-22, which illustrate a portion of the label cutter 1800, the shuttle 2005 is shown from a view offset from a top view. As mentioned above, the shuttle 2005 is moveable along the second edge 1890 of the aperture 1980. The shuttle 2005 supports the roller 1930, such that movement of the shuttle 2005 causes corresponding linear movement of the roller 1930. The linear movement of the shuttle 2005 and roller 1930 causes vertical movement of the blade 1820. The shuttle 2005 comprises a carriage 2010 which forms the body of the shuttle 2005 and at least one guide wheel 2050a, 2050b mounted upon the carriage 2010. In the illustrated embodiment, the shuttle 2005 comprises first and second guide wheels 2050a, 2050b. The carriage 2010 is disposed within the aperture 1980 and extends laterally to outside the frame 1805. The carriage 2010 is arranged to support the roller 1930, such that when the carriage 2010 is moved, the roller 1930 is moved along the same path as the carriage 2010. The curved surface of the roller 1930 faces the first edge 2200 of the aperture 1980.

Each guide wheel 2050a, 2050b comprises a portion 2055b having an increased radius which is located within the channel 1990 between the first side 1810 and the second side 1910 such that the movement of the at least one guide wheel 2050a, 2050b is limited to the along the second edge 1890 of the aperture 1980. In some embodiments, the portion having the increased radius is a central portion of the guide wheel 2050a, 2050b such that outer portions of the guide wheel run along respective edges of the first and second side frames 1810, 1910. The at least one guide wheel 2050a, 2050b is arranged at an opposite side of the carriage 2010 to the roller 1930 so the roller 1930 and at least one guide wheel 2050a, 2050b are vertically displaced from one another on the carriage 2010. The at least one guide wheel 2050a, 2050b is arranged such that its axis is perpendicular to the longitudinal axis of the platen 1830. That is, the axis of the at least one guide wheel 2050a, 2050b is parallel to the longitudinal axis of the roller 1930.

An abutment 2280 of the shuttle 2005 is arranged to engage with a groove 2410 of the upper track 2400 as shown in FIG. 22. Therefore, when the shuttle 2005 moves along the second edge 1890, the abutment 2280 may move within the groove 2410 to stabilise and retain the shuttle 2005. In some embodiments, the abutment is an upper guide wheel 2280 which is mounted upon an upper portion of the shuttle 2005. The upper guide wheel 2280 is arranged to rotate and to move along the groove 2410. The abutment or upper guide wheel 2280 may engage a locking mechanism 2250 as will be discussed below.

FIG. 21 illustrates the interaction between the shuttle 2005 and the movement mechanism 2000. The movement mechanism 2000 causes movement of the carriage 2010 which in turn causes movement of the roller 1930 which causes the blade 1820 to move to perform the cutting motion as discussed above. In particular, the belt 2030 is driven around the at least one pulley 2020a, 2020b. The belt 2030 engages with the carriage 2010 (as shown at point A) so that the belt 2030 pulls the carriage 2010 with it as the belt 2030 moves around the at least one pulley 2020a, 2020b. In the embodiment shown in FIG. 21, the belt 2030 is trapped between a recess within the carriage 2010. The movement of the carriage 2010 along with the belt 2030 causes the at least one guide wheel 2050a, 2050b to move along the second edge 1890 and movement of the roller 1930. The roller 1930 is moved in a direction parallel to the longitudinal axis of the platen 1830 along the supporting edge 1820b of the blade 1820. This mechanical arrangement translates the motion of the roller 1930 caused by the carriage 2010 into movement of the blade 1820 as the roller 1930 exerts a force on the supporting edge 1820b of the blade 1820 to cause the cutting motion of the curved cutting edge 1820a along the platen 1830.

In the embodiment shown in FIGS. 18-24, the carriage 2010 is generally triangularly shaped with two lower guide wheels 2050a, 2050b and one upper guide wheel 2280. The roller 1930 is located at an upper apex and the two guide wheels 2050a, 2050b are located at two lower adjacent apexes. However, it will be appreciated that other shaped carriages could be used with different positioning of the roller and the at least one guide wheel, such as an oval or rectangle, provided that the roller 1930 contacts the supporting edge 1820b of the blade 1820 and the at least one guide wheel 2050a, 2050b moves along the second edge 1890.

Figure 23:
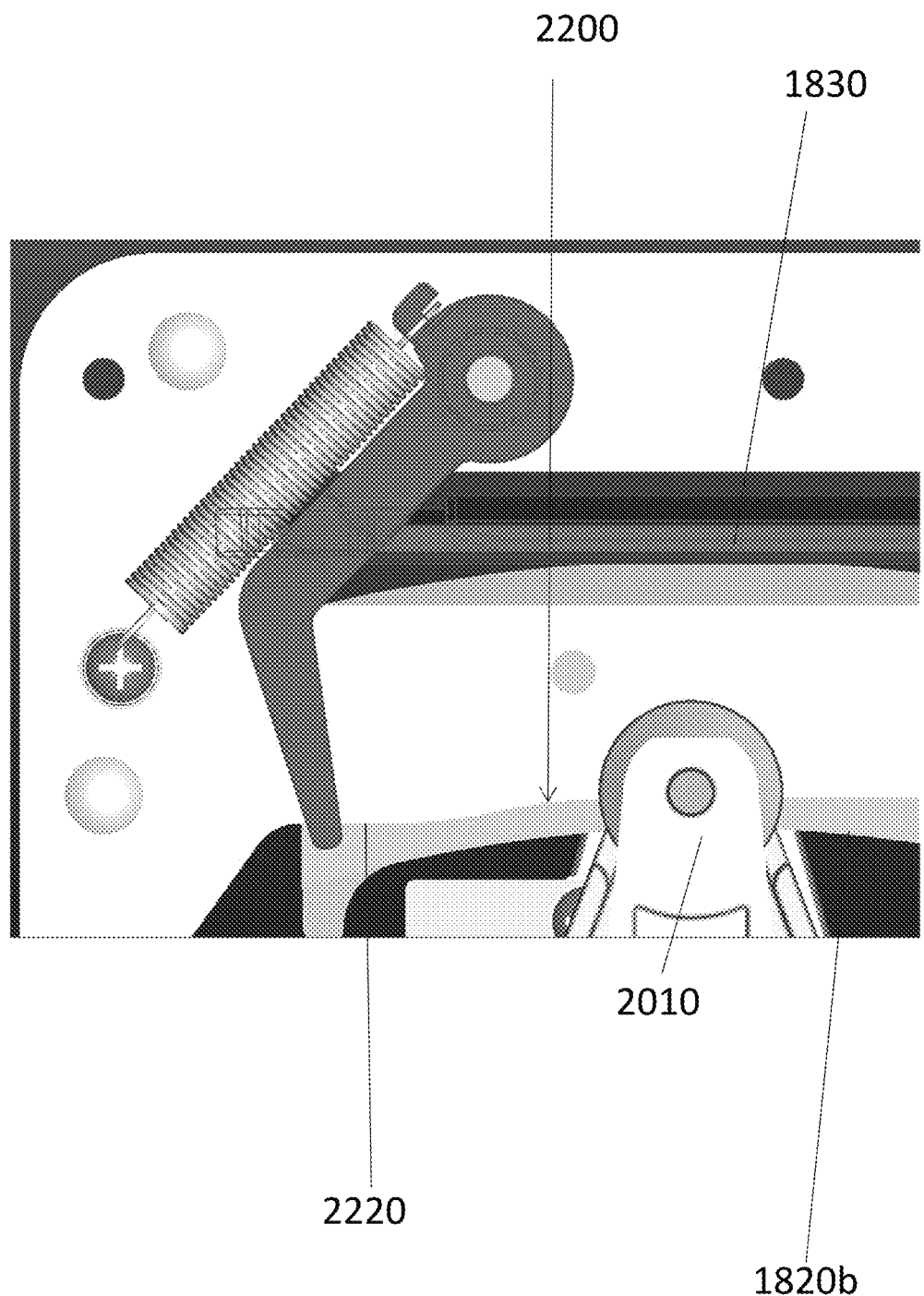
FIG. 23 illustrates a portion of the label cutter of FIG. 18.

FIG. 23 illustrates the blade 1820 performing a cutting motion in which the roller 1930 is exerting force on the supporting edge 1820b of the blade 1820 which causes a part of the curved cutting edge 1820a to contact the platen 1830. When the blade 1820 performs the cutting motion, the first edge 2200 of the aperture 1980 does not experience any force from the roller 1930. This is because the supporting edge 1820b of the blade 1820 extends beyond, particularly below, the first edge 2200 of the frame so that the spring-loaded roller 1930, which is resiliently biased towards the platen 1830, contacts the supporting edge 1820b of the blade 1820 before the first edge 2200. In FIG. 23, the blade 1820 and the shuttle 2005 are distal from the 'home position' i.e. in a cutting position. However a portion of the first edge 2200, indicated as lower portion 2220, proximal to the home position is shaped to extend away from the platen 1830 i.e. further downward than a portion 2220 of the edge corresponding to the cutting position. The lower portion 2220 is arranged to remove the force exerted on the blade 1820 from the roller 1930 as the shuttle 2005 approaches the home position.

Figure 24:
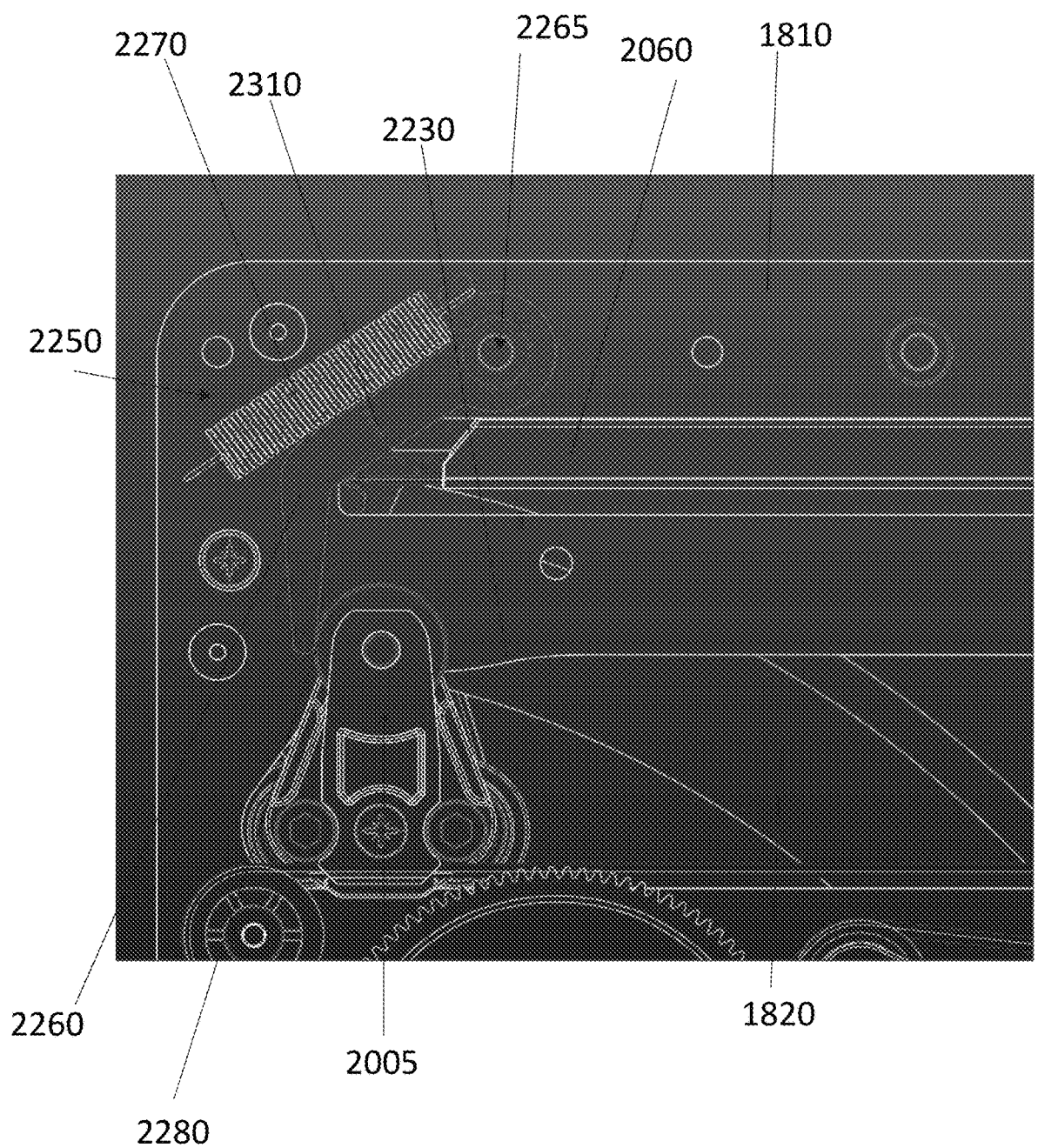
FIG. 24 illustrates a line drawing of a front view of the label cutter of FIG. 18.

FIG. 24 illustrates a line drawing of a portion of the shuttle 2005 and the blade 1820 in the 'home position'. The lower portion 2220 of the first edge 2200 extends below the supporting edge 1820b so that, when the blade 1820, shuttle 2005 and roller 1930 move toward the 'home position', the supporting edge 1820b of the blade is subject to a reduced force from the roller 1930. In some embodiments, the roller 1930 may not contact the blade 1820 in the home position. This is because the lower portion 2220 of the first edge 2200 is curved to extend below the supporting edge 1820b of the blade 1820 in the 'home position' so that the spring-loaded roller 1930, which is resiliently biased towards the platen 1830, contacts the lower portion 2220 before the supporting edge 1820b.

Therefore, in the 'home position', the roller 1930 exerts a force on the lower portion 2220 of the first edge 2200 instead of the supporting edge 1820b of the blade 1820 because the lower portion 2220 is at a lower vertical displacement than the supporting edge 1820b of the blade 1820 when the blade 1820 is in the 'home position'. This relieves the pressure from the platen 1830 to enable the platen 1830 to be easily removed.

The transition of the roller 1930 from exerting the biasing force on the supporting edge 1820b of the blade 1820 to exerting force on the lower portion 2220 of the first edge 2200 may be facilitated by an inclined portion 2230 of the first edge 2200. As the shuttle 2005 is moved towards the 'home position', roller 1930 may be moved from the supporting edge 1820b onto the inclined portion 2230 and forced downwards onto the lower portion 2220.

It will be appreciated that since the position of the blade 1820 is controlled by the position of the roller 1930, when the roller 1930 (and the shuttle 2005) are in the 'home position', the blade 1820 is also in the 'home position'. The 'home position' of the blade 1820 is when an end of the cutting edge 1820a of the blade 1820 is positioned at an end of the platen 1830.

Figure 25:
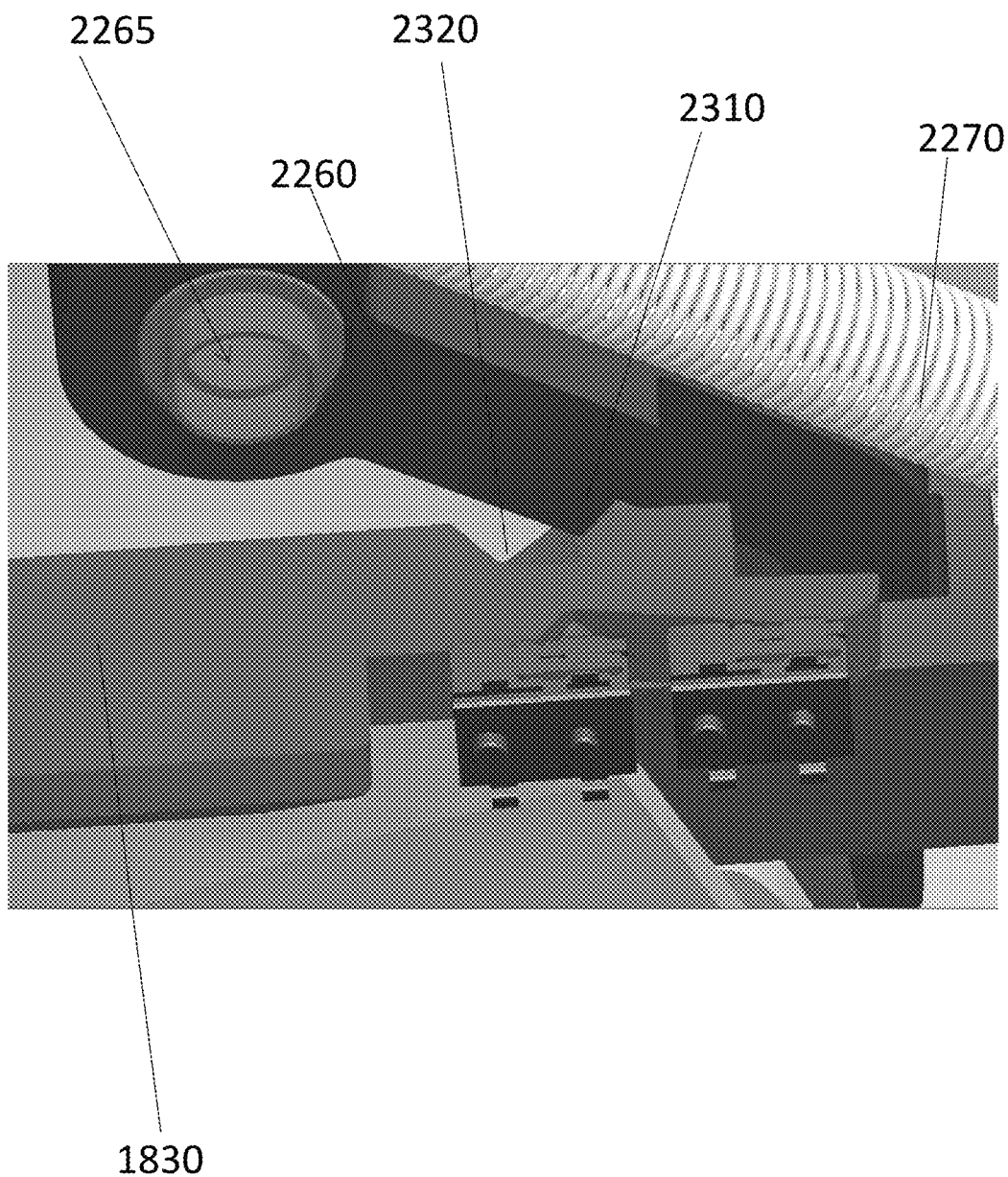
FIG. 25 illustrates a schematic of another portion of the label cutter of FIG. 18.

FIGS. 24 and 25 also illustrate the locking mechanism 2250 comprising a locking feature 2310 which is arranged to engage with the platen 1830 to prevent removal of the platen 1830 in certain conditions, as will be explained.

The locking mechanism 2250 comprises a locking arm 2260. The locking arm 2260 is moveable by the shuttle 2005. The locking arm 2260 is moveable between locked and unlocked positions. In FIG. 24 the locking arm is shown in the unlocked position. The locking arm 2260 is arranged to rotate around a pivot 2265 between the locked and unlocked positions. The pivot 2265 is arranged at a first end of the locking arm 2260. The locking arm 2260 is moved between the locked and unlocked positions by movement of the shuttle. In the home position, as shown in FIG. 24, the shuttle 2005 contacts a second end of the locking arm 2260 to cause rotation of the locking arm 2260 from the locked position to the unlocked position.

The locking arm 2260 is attached to a resilient member 2270, which may be a spring 2270, such as a coil spring 2270, referred to as locking spring 2270. In the embodiment shown in FIG. 24, the locking spring 2270 is attached to the locking arm 2260 via a hook extending from the locking arm 2260. However, other ways to attach the locking spring 2270 to the locking arm 2260 are envisaged. The locking spring 2270 is arranged to bias the locking arm 2260 to the locked position. When the shuttle 2005 contacts a second end of the locking arm 2260, a force of the shuttle 2005 is exerted on the locking arm to overcome the biasing force of the locking spring 2270 to cause rotation of the locking arm 2260 about the pivot 2265 from the locked to the unlocked position.

Figure 26:
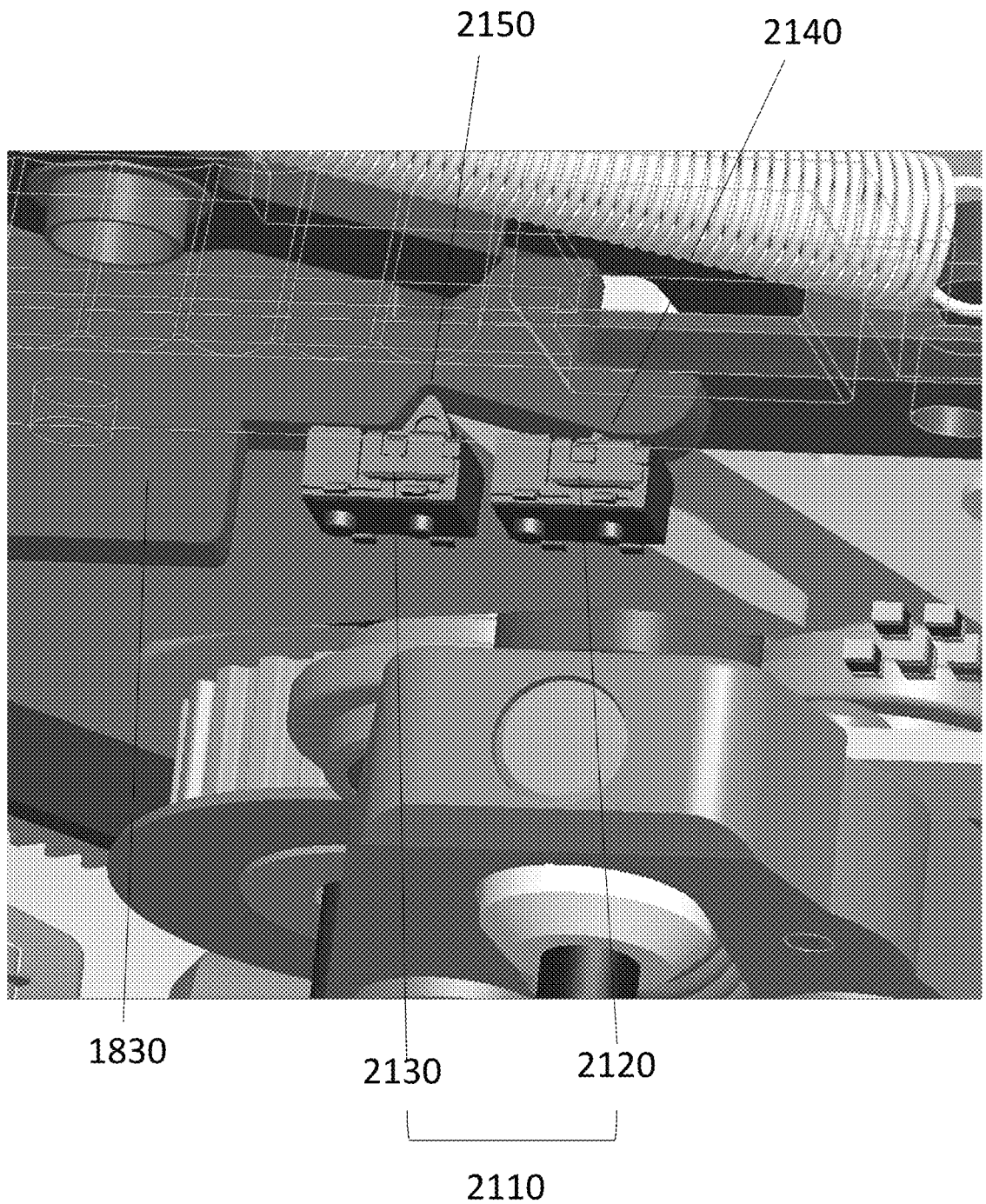
FIG. 26 illustrates a schematic of another portion of the label cutter of FIG. 18.

FIGS. 25 and 26 in particular show locking of the platen 1830 controlled by the locking arm 2260. The locking arm comprises a locking feature 2310 which is a shaped portion of the locking arm 2260 configured to be received in an opening 2320 of the platen 1830. The opening 2320 is of a corresponding shape to the locking feature 2310. The locking feature 2310 engages with the platen 1830 to prevent removal thereof from the label cutter. Movement of the locking arm 2260 causes corresponding movement of the locking feature 2310 in and out of the opening 2320 of the platen 1830. The locking feature 2310 may be attached to or integrated with the locking arm 2260. When the shuttle 2005 is not in the 'home position', i.e. the shuttle is moved along the aperture, the locking arm 2260 is biased into the 'locked position' where the second end of the locking arm 2260 extends into the path of the shuttle 2005. The 'unlocked position' of the locking arm 2260 is illustrated in FIG. 23.

The engagement between the locking feature 2310 and the opening 2320 locks the platen 1830 in position and prevents the platen 1830 from being able to be removed. The locking feature 2310 is moved out of the opening 2320 when the shuttle 2005 is in the 'home position' so the platen 1830 is able to be removed as shown in FIG. 25 and described below.

As previously mentioned, the carriage 2010 comprises the abutment 2280. The abutment 2280 is arranged to engage the locking arm 2260 when the shuttle 2005, roller 1930 and blade 1820 are in the 'home position'. The abutment 2280 exerts a force on the locking arm 2260 which causes the locking arm 2260 to move which in turn causes the locking spring 2270 to move. When the locking spring 2270 moves, the locking feature 2310 is moved out of the opening 2320. In FIGS. 24 and 25, the movement of the locking arm 2260 is a rotation pivoted around pivot 2265. This rotation is slight but causes the locking spring 2270 to extend which causes the locking feature 2310 to move out of the opening 2320 (as illustrated in FIG. 25). Hence when the shuttle 2005, roller 1930 and blade 1820 are in the home position the platen 1830 is free to be removed because there is no coupling between the locking feature 2310 and the opening 2320 of the platen 1830 to hold the platen 1830 in place.

When the shuttle 2005 is moved away from the 'home position', the locking feature 2310 is moved back into the opening 2320 so that the platen 1830 cannot be removed as it is held in place by the coupling of the locking feature 2310 and the opening 2320 of the platen. This means that the platen 1830 cannot be removed if the blade 1820 is not in the home position. This is advantageous because removing the platen 1830 with the blade 1820 stopped along the length of the platen 1830, could cause the blade 1820 to become dislodged or jammed, leaving the cutter inoperable and potentially making it less safe.

The abutment 2280 in FIG. 24 is illustrated as an alignment wheel attached to the carriage 2010. However, it will be appreciated that the abutment 2280 could have a different shape or could be integrated as part of the carriage 2010 provided that it is arranged to engage the locking arm 2260 when the shuttle 2005 is in the 'home position'. In FIG. 25, the locking feature 2310 is a cut-out of the locking arm 2260 and the opening 2320 is a notch in the platen 1830. However, it will be appreciated that the locking feature 2310 and the opening 2320 are not limited to this example.

FIG. 26 illustrates a top view of the label cutter 1800 in which the platen 1830 mounted in the label cutter 1800 and detection means 2110 can be seen. The detection means 2110 is arranged to detect various parameters associated with the label cutter 1800. The parameters may relate to thresholds set for safety, information or operation purposes. For example, the label cutter 1800 may comprise detection means 2110 which are arranged to detect at least one of: full insertion of the platen 1830 and a type of platen inserted. The detection means 2110 may be at least one detector such as a switch (e.g. a manual switch such as a toggle switch or an electronic switch such as a solid-state switch) or a sensor (e.g. an optical sensor such as a proximity detector). The detection means 2110 may be arranged to detect the parameters associated with the label cutter 1800 according to at least one indicator associated with the label cutter 1800.

In some embodiments, the detection means 2110 comprises a first detect switch 2120 and a second detect switch 2130. As will be appreciated, detect switches comprise an actuator which controls the switch depending on whether the actuator is engaged or not. The actuators of the first detect switch 2120 and the second detect switch 2130 may be engaged by a first indicator 2140 and a second indicator 2150.

In FIG. 26, the first indicator 2140 and the second indicator 2150 are integrated into the shape of the platen 1830. The actuators of the first detect switch 2120 and the second detect switch 2130 are engaged in dependence on the shape of the platen inserted into the label cutter 1800.

FIG. 26 illustrates a shape of platen in which the first indicator 2140 engages the first detect switch 2120 and the second indicator 2150 does not engage the second detect switch 2130. This configuration of the first and second indicator may correspond to a smooth platen. A platen shaped so that the first indicator 2140 and the second indicator 2150 engage the first 2120 and second 2130 detect switch respectively may correspond to a platen with a grooved surface. The first detect switch 2120 is arranged to detect whether the platen 1830 is fully inserted. Therefore, it will be appreciated that all types of platen will be shaped to engage the first detect switch 2120. This improves the safety of the label cutter 1800 because, for example, if the first detection switch 2120 detects that the platen 1830 is not fully inserted, then feedback may be provided to the user or the label cutter 1800 may not operate until the first detect switch 2120 detects that the platen 1830 is fully inserted.

The second detect switch 2130 is arranged to detect what type of platen is inserted. Therefore, the type of platen inserted into the label cutter 1800 is indicated by the shape of the platen itself in dependence on whether the second detect switch 2130 is engaged or not. As previously mentioned, the platen 1830 may be smooth for a full cut or one or more grooves for a partial cut. Feedback may be provided to the user to inform the user of which type of platen is inserted into the label cutter. Different labels may have different cutting preferences, for example some labels may require a full cut whilst others may require a partial cut. Therefore, advantageously, the user is able to easily identify which platen is inserted and, in some embodiments, the label cutter may not operate until the second detect switch detects that the correct platen is inserted for the type of label being cut.

The second indicator 2150 is depicted as a recess in the profile of the platen 1830 in FIG. 26 which does not engage the actuator of the second detect switch 2130. In order to indicate that a different type of platen is inserted, the second indicator 2150 may have no recess such that it forms a straight line with the first indicator 2140. It will be appreciated that other arrangements may be used in which a protrusion from the platen is used to engage the first and second detect switch 2120, 2130.

Various modifications to the detailed designs described above are envisaged. It is envisaged that in some examples, the platen comprises a resiliently deformable surface. Therefore as the blade rollingly engages with the label in between the platen and blade, the platen can resiliently deform away from the cutting site, reducing the amount of wear experienced by the platen. Additionally, in some examples, it is envisaged that the platen may be movable away from the blade so as to provide a means of loading label material into and remove label material out of the label cutter. It is further envisaged that the label cutter may comprise a locking mechanism arranged to selectively remove the platen to provide easy access to the materials in between the platen and blade, e.g. label. For example, a section of a fixed platen may be provided to affix the blade in place to facilitate raising, moving or removal of the rest of the platen to provide access to the bottom edge of the platen and to the cutter. It is envisaged that the platen may be drawn through a small gap having a sharp edge for clearing glue, for example, before the platen is returned into its operating condition. In some examples, the platen is configured to rotate about its axis such that when adhesive builds up on the surface which the blade contacts, then the platen may be rotated to present a clean surface. It is also envisaged that the platen comprises a self-healing material such as rubber or acrylic.

It will be clear to a person skilled in the art that features described in relation to any of the embodiments described above can be application interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Through the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect embodiment, or example described herein unless incompatible therewith. All of the features disclosed in this specification (including any accompanying claims, abstract or drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. A label cutter comprising a blade having a curved cutting edge configured and arranged to move towards a platen in order to cut a label material placed between them; a force applicator comprising a roller that is arranged and configured to apply a force to a portion of the blade in the direction of the platen; an actuator operatively coupled to the force applicator and operable to cause the force applicator to move; the force applicator being moveable in order to, in use, apply a force to consecutive portions of the blade in the direction of the platen so as to provide a rolling engagement between the blade and the platen;
   wherein the blade comprises an engaging portion protruding from the body portion to contact the roller to define a pivot position of the blade;
   wherein the engaging portion is arranged to retain the blade in place.

2. A label cutter according to claim 1, wherein the blade comprises a body portion having the curved cutting edge at a first edge and a supporting edge at the opposing edge.

3. A label cutter according to claim 1, wherein the blade is a mezzaluna (half moon) blade.

4. A label cutter according to claim 1, wherein the blade comprises a single curved cutting edge.

5. A label cutter according to claim 1, wherein the curved cutting edge is convex in the direction of the platen.

6. A label cutter according to claim 1, wherein the force applicator is configured and arranged to, in use, apply an equal force to consecutive portions of the blade in the direction of the platen.

7. A label cutter according to claim 1, wherein the force applicator is moveable along the length of the blade.

8. A label cutter according to claim 1, wherein the roller comprises a longitudinal axis perpendicular to the curved cutting edge of the blade and further wherein the roller is caused to move, by the actuator, in a direction perpendicular to its longitudinal axis and parallel to the curved cutting edge of the blade.

9. A label cutter according to claim 1, wherein the blade comprises a body portion having the curved cutting edge at a first edge and a supporting edge at the opposing edge and the roller exerts a force on the supporting edge of the blade in which the force is transferred through the body portion of the blade to the curved cutting edge of the blade.

10. A label cutter according to claim 1, wherein the roller exerts a constant force on the curved cutting edge of the blade as it moves along the length of the blade.

11. A label cutter according to claim 1, wherein the roller is resiliently biased against the blade.

12. A label cutter according to claim 1, wherein the blade is caused by the force applicator to rotate away from the platen by rotating about the pivot position.

13. A label cutter according to claim 1, wherein the engaging portion is configured to engage the force applicator when the force applicator is in a predetermined position.

14. A label cutter according to claim 1, wherein the force applicator is operable to apply a force to a portion of the blade in the direction of the platen and normal to the portion of the curved cutting edge lying on the vector of the applied force.

15. A label cutter according to claim 1, wherein the platen comprises a resiliently deformable surface.

16. A label cutter according to claim 1, wherein the engaging portion has at least one surface that is hook-shaped for being contacted by the force applicator.

17. A label cutter according to claim 16, wherein the hook shaped surface retains the blade by engaging with a portion of a housing, causing the hook-shaped surface to reposition the blade when the roller moves along the blade.

18. A label issuing device comprises a label cutter according to claim 1.

* * * * *